US011803930B2

(12) United States Patent
Minakawa et al.

(10) Patent No.: US 11,803,930 B2
(45) Date of Patent: Oct. 31, 2023

(54) TIMETABLE MODIFICATION DEVICE AND AUTOMATIC TRAIN CONTROL SYSTEM

(71) Applicants: Hitachi, Ltd., Tokyo (JP); Hitachi Rail STS S.p.A., Genoa (IT)

(72) Inventors: Tsuyoshi Minakawa, Tokyo (JP); Keiji Kimura, Tokyo (JP); Tatsuhiro Satou, Tokyo (JP); Michi Kariatsumari, Tokyo (JP); Claudio Giorgianni, Genoa (IT)

(73) Assignees: Hitachi, Ltd., Tokyo (JP); Hitachi Rail STS S.p.A., Genoa (IT)

( * ) Notice: Subject to any disclaimer, the term of this patent is extended or adjusted under 35 U.S.C. 154(b) by 201 days.

(21) Appl. No.: 16/640,875

(22) PCT Filed: Oct. 4, 2018

(86) PCT No.: PCT/JP2018/037266
§ 371 (c)(1),
(2) Date: Feb. 21, 2020

(87) PCT Pub. No.: WO2019/078025
PCT Pub. Date: Apr. 25, 2019

(65) Prior Publication Data

US 2020/0357091 A1 Nov. 12, 2020

(30) Foreign Application Priority Data

Oct. 16, 2017 (JP) ................................. 2017-200250

(51) Int. Cl.
*G06Q 50/30* (2012.01)
*G06Q 10/0631* (2023.01)
*B61L 27/12* (2022.01)

(52) U.S. Cl.
CPC ............. *G06Q 50/30* (2013.01); *B61L 27/12* (2022.01); *G06Q 10/06311* (2013.01)

(58) Field of Classification Search
None
See application file for complete search history.

(56) References Cited

U.S. PATENT DOCUMENTS 7,725,249 B2 * 5/2010 Kickbusch .............. B61L 27/16 701/19
8,154,227 B1 * 4/2012 Young .................... A63H 30/04 318/268

(Continued)

FOREIGN PATENT DOCUMENTS

EP 0474120 B1 * 11/2001 .......... B61L 27/0027
EP 2 853 467 A1 4/2015

(Continued)

OTHER PUBLICATIONS

Sun, Yuxing, Biao Leng, and Wei Guan. “A novel wavelet-SVM short-time passenger flow prediction in Beijing subway system.” Neurocomputing 166 (2015): 109-121 (Year: 2015).*

(Continued)

*Primary Examiner* — Darlene Garcia-Guerra
(74) *Attorney, Agent, or Firm* — Crowell & Moring LLP

(57) ABSTRACT

The present invention makes it possible to supply transportation capacity suitable for movement demand in numerous circumstances. A timetable modification device for changing a timetable representing a train control target, in accordance with a movement demand prediction result indicating, for each time period, the number and destination of passengers at each station at which the train stops, the timetable modification device having a violation position extraction program P01*a* for calculating the degree of congestion of a train on the basis of predicted demand information representing a movement demand prediction result and extracting a violation position at which the degree of congestion is outside a predetermined allowed range, and a timetable correction program P01*b* for changing a timetable so as to (Continued)

include a change in the destination of the train so that the degree of congestion of the violation position is within the allowed range or so that the degree of congestion of the violation position approaches the allowed range.

7 Claims, 17 Drawing Sheets

(56) References Cited

U.S. PATENT DOCUMENTS

| | | | | |
|---|---|---|---|---|
| 8,538,611 | B2 * | 9/2013 | Kumar | B61L 27/16 700/291 |
| 8,700,438 | B1 * | 4/2014 | Heinold | G06Q 10/06 705/7.12 |
| 9,171,345 | B2 * | 10/2015 | Rieppi | G06Q 10/04 |
| 9,205,851 | B2 * | 12/2015 | Yoshimoto | B61L 27/16 |
| 10,040,464 | B2 * | 8/2018 | Abrosimov | B61L 27/40 |
| 10,507,853 | B2 * | 12/2019 | Kaede | B61L 3/125 |
| 11,110,944 | B2 * | 9/2021 | Yanai | B61L 3/12 |
| 2003/0236598 | A1 * | 12/2003 | Villarreal Antelo | B61L 27/14 701/19 |
| 2004/0059442 | A1 * | 3/2004 | Birkelbach | G05B 17/02 700/30 |
| 2010/0322516 | A1 * | 12/2010 | Xu | G06V 20/53 382/173 |
| 2013/0318002 | A1 * | 11/2013 | Tomiyama | G06Q 10/08355 705/338 |
| 2014/0012498 | A1 * | 1/2014 | Gustafson | G01C 21/3423 701/537 |
| 2014/0088865 | A1 * | 3/2014 | Thies | G01C 21/34 701/465 |
| 2014/0236957 | A1 * | 8/2014 | Rieppi | G06Q 10/063 707/741 |
| 2015/0066558 | A1 * | 3/2015 | Kimiagar | G06Q 10/08 705/7.17 |
| 2015/0232097 | A1 * | 8/2015 | Luther | B61L 27/16 701/1 |
| 2015/0286936 | A1 * | 10/2015 | Furuya | G06Q 50/30 706/58 |
| 2015/0360705 | A1 * | 12/2015 | Niinomi | B60L 15/40 701/118 |
| 2015/0360706 | A1 * | 12/2015 | Niinomi | B61L 27/12 701/19 |
| 2016/0009304 | A1 * | 1/2016 | Kumar | B61L 27/40 701/19 |
| 2016/0104081 | A1 * | 4/2016 | Ho | H04W 4/029 705/7.27 |
| 2016/0339935 | A1 * | 11/2016 | Fournier | B61L 3/006 |
| 2017/0200082 | A1 * | 7/2017 | Böhm | G06N 5/022 |
| 2018/0082586 | A1 * | 3/2018 | Sengupta | H04W 4/029 |

FOREIGN PATENT DOCUMENTS

| | | | | | |
|---|---|---|---|---|---|
| GB | 2507163 | A | | 4/2014 | |
| JP | 59-45546 | B2 | | 11/1984 | |
| JP | 9-123913 | A | | 5/1997 | |
| JP | 2005-280637 | A | | 10/2005 | |
| JP | 2006-327239 | A | | 12/2006 | |
| JP | 2007-15424 | A | | 1/2007 | |
| JP | 2007-237948 | A | | 9/2007 | |
| JP | 2008-184032 | A | | 8/2008 | |
| JP | 2013-241145 | A | | 12/2013 | |
| JP | 2014-40161 | A | | 3/2014 | |
| JP | 2014-210530 | A | | 11/2014 | |
| JP | 2014-237345 | A | | 12/2014 | |
| WO | WO 2015/063823 | A1 | | 5/2015 | |
| WO | WO-2015063823 | A1 | * | 5/2015 | B61L 27/0016 |

OTHER PUBLICATIONS

Yin, Jiateng, et al. "Efficient real-time train operation algorithms with uncertain passenger demands." IEEE transactions on intelligent transportation systems 17.9 (2015): 2600-2612 (Year: 2015).*

Yao, Xiangming, et al. "Simulation-based dynamic passenger flow assignment modelling for a schedule-based transit network." Discrete Dynamics in Nature and Society 2017 (2017) (Year: 2017).*

Carey, Malachy, and Sinead Carville. "Scheduling and platforming trains at busy complex stations." Transportation Research Part A : Policy and Practice 37.3 (2003): 195-224 (Year: 2003).*

Dong, Hairong, et al. "Automatic train control system development and simulation for high-speed railways." IEEE circuits and systems magazine 10.2 (2010): 6-18 (Year: 2010).*

Supplementary European Search Report issued in European Application No. 18869344.4 dated Jun. 11, 2021 (ten (10) pages).

International Search Report (PCT/ISA/210) issued in PCT Application No. PCT/JP2018/037266 dated Jan. 15, 2019 with English translation (five paes).

Japanese-language Written Opinion (PCT/ISA/237) issued in PCT Application No. PCT/JP2018/037266 dated Jan. 15, 2019 (five pages).

* cited by examiner

F I G. 4 A

RESOURCE USE ORDER INFORMATION
(PLATFORM USE ORDER INFORMATION)

D12a

| STATION ID | PLATFORM ID | TRAIN ID | … |
|---|---|---|---|
| ST03 | #2 | TR002 | … |
| ST03 | #2 | TR004 | … |
| ST03 | #2 | TR006 | … |
| … | … | … | … |
| ST03 | #2 | TR300 | … |
| PK03 | #1 | TR015 | … |
| ST08 | #1 | TR001 | … |
| ST08 | #1 | TR005 | … |
| … | … | … | … |

F I G. 4 B

RESOURCE USE ORDER INFORMATION
(INTER-STATION TRACK USE ORDER INFORMATION)

D12b

| INTER-STATION TRACK ID | DEPARTURE STATION ID | TRAIN ID | … |
|---|---|---|---|
| ST05-ST06-LN1 | ST05 | TR001 | … |
| ST05-ST06-LN1 | ST05 | TR003 | … |
| … | … | … | … |
| ST05-ST06-LN1 | ST05 | TR299 | … |
| ST03-PK03-LN3 | ST03 | TR015 | … |
| ST03-PK03-LN3 | PK03 | TR015 | … |
| … | … | … | … |

BASIS DATA (ROUTE INFORMATION)

D01a

| ROUTE ID | STATION ID | PLATFORM ID | DEPARTURE SIDE TRACK ID | STOPPAGE CLASSIFICATION |
|---|---|---|---|---|
| RT001 | ST06 | #1 | LN2 | STOPPAGE |
| RT001 | ST05 | #2 | LN2 | PASSING |
| RT001 | ST04 | #2 | LN2 | STOPPAGE |
| ... | ... | ... | ... | ... |
| RT001 | ST01 | #2 | — | STOPPAGE |
| RT002 | ST01 | #1 | LN1 | STOPPAGE |
| RT002 | ST02 | #1 | LN1 | STOPPAGE |
| ... | ... | ... | ... | ... |
| RT010 | ST07 | #1 | — | STOPPAGE |
| RT011 | ST03 | #2 | LN3 | STOPPAGE |
| RT011 | PK03 | #1 | — | STOPPAGE |
| RT012 | ST07 | #1 | LN5 | STOPPAGE |
| ... | ... | ... | ... | ... |

FIG. 6B

TIMETABLE CHANGE PATTERN INFORMATION (TIMETABLE STATE INFORMATION)

D22

| TRAIN ID | ROUTE ID | PREVIOUS OPERATION TRAIN ID | SUBSEQUENT OPERATION TRAIN ID | TRAIN ATTRIBUTE | PLATFORM USE ORDER PRECEDING TRAIN (1) | INTER-STATION TRACK USE ORDER PRECEDING TRAIN (1) | PLATFORM USE ORDER PRECEDING TRAIN (2) | INTER-STATION TRACK USE ORDER PRECEDING TRAIN (2) | … |
|---|---|---|---|---|---|---|---|---|---|
| PTR001 | RT003 | – | PTR002 | OPERATION CONNECTION | – | – | – | – | … |
| PTR002 | RT001 | PTR001 | PTR008 | CHANGE TARGET | PTR001 | – | – | – | … |
| PTR003 | RT004 | – | PTR004 | OPERATION CONNECTION | – | – | – | – | … |
| PTR004 | RT005 | PTR003 | PTR009 | CHANGE TARGET | PTR003 | PTR002 | PTR002 | PTR002 | … |
| … | … | … | … | … | … | … | … | … | … |

F I G. 6 C

TIMETABLE CHANGE PATTERN INFORMATION (POST-CHANGE TRAIN GROUP INFORMATION)

D25

| TRAIN ID | ROUTE ID | PREVIOUS OPERATION TRAIN ID | SUBSEQUENT OPERATION TRAIN ID | PLATFORM USE ORDER PRECEDING TRAIN (1) | INTER-STATION TRACK USE ORDER PRECEDING TRAIN (1) | PLATFORM USE ORDER PRECEDING TRAIN (2) | INTER-STATION TRACK USE ORDER PRECEDING TRAIN (2) | ... |
|---|---|---|---|---|---|---|---|---|
| PTR001 | RT001 | PTR001 | PTR102 | PTR001 | – | – | – | ... |
| PTR002 | RT007 | PTR101 | PTR103 | PTR101 | PTR010 | PTR010 | PTR010 | ... |
| PTR003 | RT001 | PTR102 | PTR104 | PTR102 | PTR111 | PTR111 | PTR111 | ... |
| PTR004 | RT007 | PTR103 | PTR005 | PTR003 | PTR012 | PTR012 | PTR012 | ... |
| ... | ... | ... | ... | ... | ... | ... | ... | ... |

F I G. 7

NUMBER-OF-PEOPLE-WAITING-FOR-TRAIN INFORMATION

D07

| STATION ID | PLATFORM ID | TIME | NUMBER OF PEOPLE | ... |
|---|---|---|---|---|
| ST01 | #1 | 07:00:00 | 30 | ... |
| ST01 | #2 | 07:00:00 | 0 | ... |
| ST02 | #1 | 07:00:00 | 46 | ... |
| ST02 | #2 | 07:00:00 | 5 | ... |
| ... | ... | ... | ... | ... |
| ST04 | #1 | 08:00:30 | 65 | ... |
| ST04 | #2 | 08:00:30 | 38 | ... |
| ... | ... | ... | ... | ... |

F I G. 8

NUMBER-OF-TRAIN-PASSENGERS INFORMATION

D08

| TRAIN ID | ROUTE ID | DEPARTURE STATION ID | CAPACITY | NUMBER OF PEOPLE | ... |
|---|---|---|---|---|---|
| TR001 | RT001 | ST06 | 300 | 176 | ... |
| TR001 | RT001 | ST05 | 300 | 281 | ... |
| TR001 | RT001 | ST04 | 300 | 300 | ... |
| TR001 | RT001 | ST03 | 300 | 73 | ... |
| TR001 | RT001 | ST02 | 300 | 35 | ... |
| TR002 | RT002 | ST01 | 400 | 48 | ... |
| TR002 | RT002 | ST02 | 400 | 136 | ... |
| ... | ... | ... | ... | ... | ... |

MOVEMENT DEMAND INFORMATION

D09

| ENTRANCE TIME PERIOD | BOARDING STATION ID | GETTING-OFF STATION ID | NUMBER OF PEOPLE | ... |
|---|---|---|---|---|
| 07:00:00 - 07:10:00 | ST06 | ST05 | 28 | ... |
| 07:00:00 - 07:10:00 | ST06 | ST04 | 42 | ... |
| 07:00:00 - 07:10:00 | ST06 | ST03 | 76 | ... |
| 07:00:00 - 07:10:00 | ST06 | ST02 | 15 | ... |
| ... | ... | ... | ... | ... |
| 08:00:00 - 08:10:00 | ST04 | ST03 | 45 | ... |
| 08:00:00 - 08:10:00 | ST04 | ST02 | 18 | ... |
| ... | ... | ... | ... | ... |

F I G. 1 1
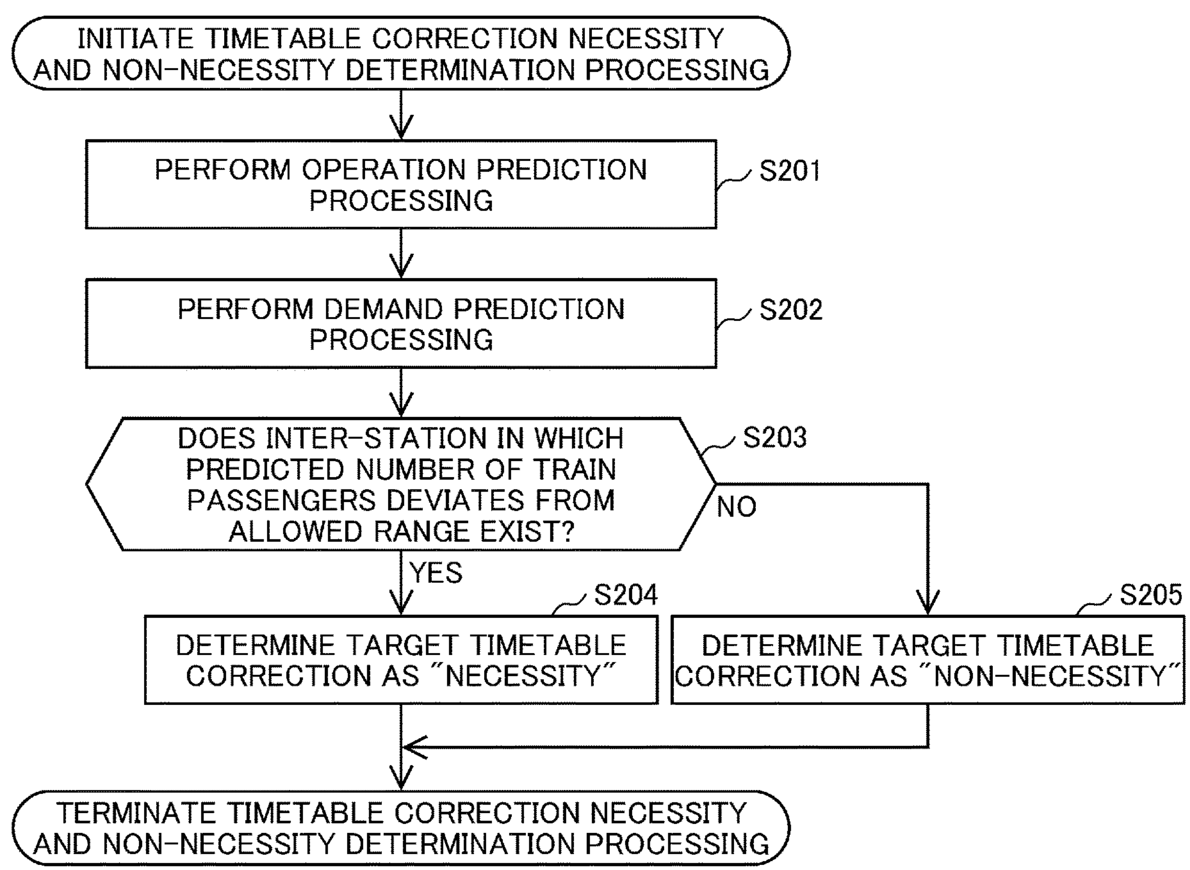

F I G. 1 2
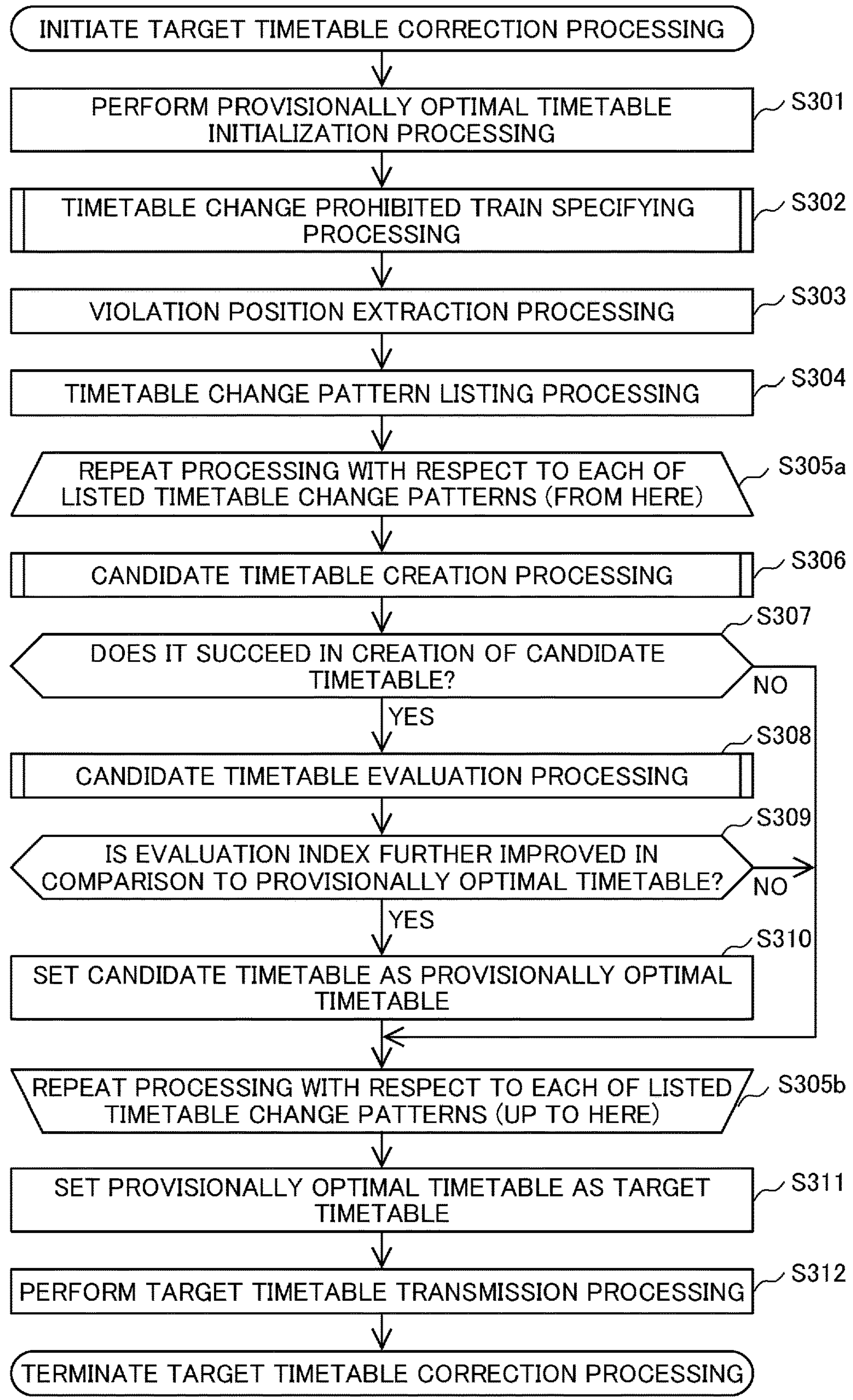

F I G. 1 3
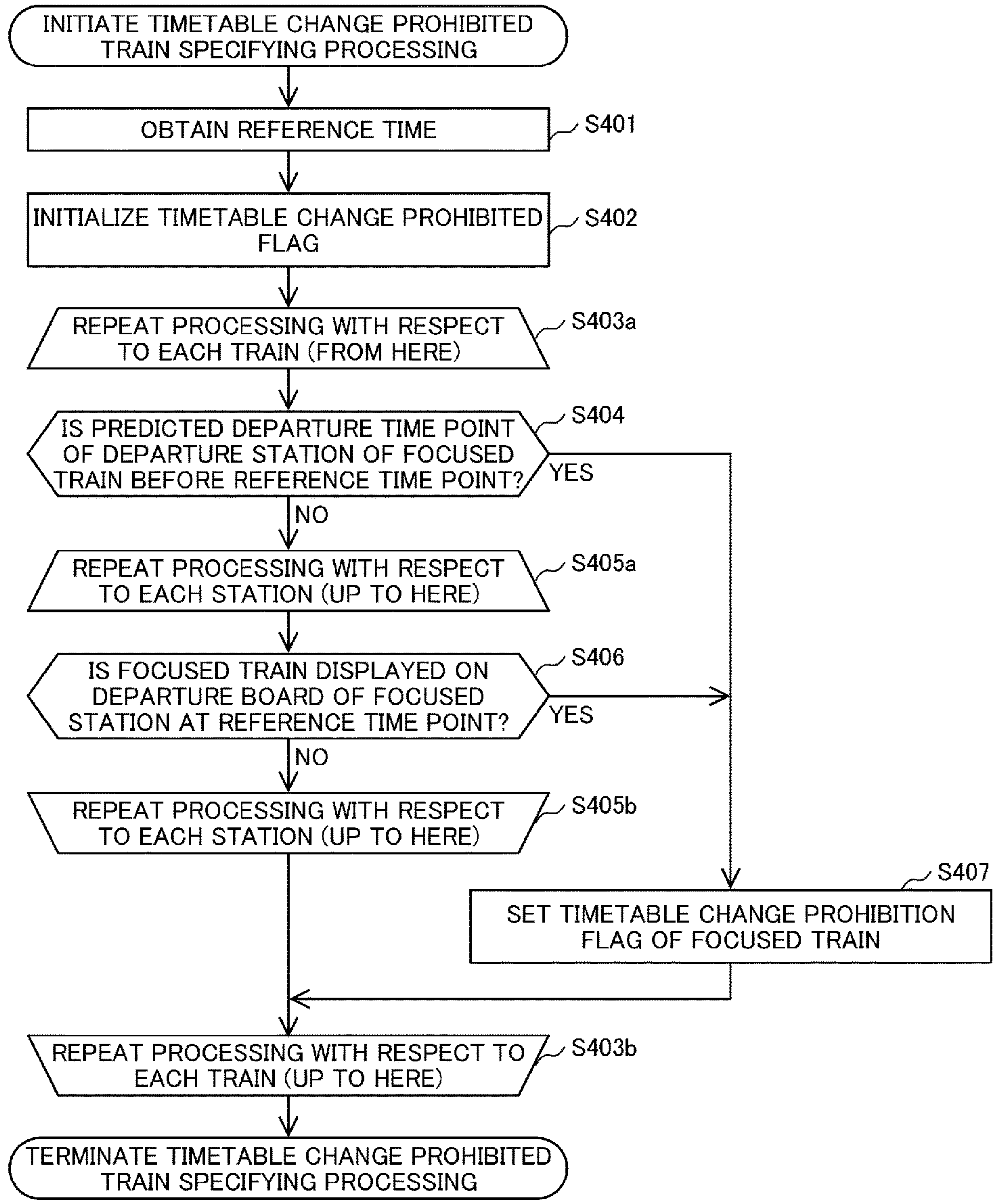

F I G. 1 7
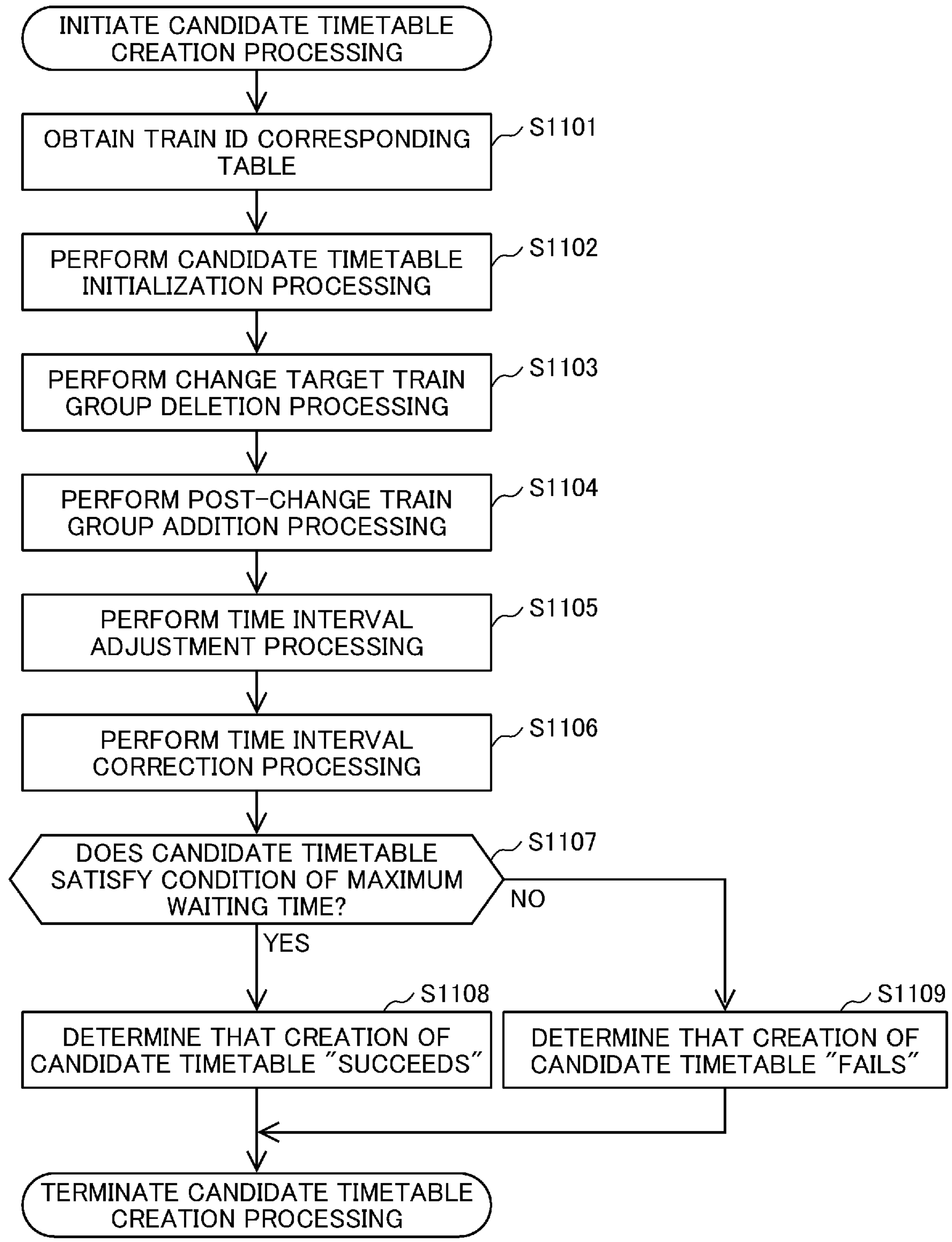

TIMETABLE MODIFICATION DEVICE AND AUTOMATIC TRAIN CONTROL SYSTEM

TECHNICAL FIELD

The present invention relates to a traffic system that dynamically adjusts the number of trains in correspondence with an increase or a decrease in movement demand, and particularly to, a timetable modification device that corrects a diagram (hereinafter, referred to as "timetable") that is an operation plan of each of the trains in correspondence with an increase or a decrease in the movement demand, and an automatic train control system that performs control so that each train travels in accordance with the corrected timetable of the train.

BACKGROUND ART

One of factors which have an effect on comfort of passengers in a public transportation system represented by a rail transportation service is the degree of congestion of vehicles. For example, in the case of the railways, when a boarding rate of trains increases, a personal space becomes narrow and discomfort of passengers increases. In addition to this, there is also a problem that it takes more time for passenger to get on and off at stop stations, and thus trains are likely to be delayed and are difficult to arrive at a destination at a scheduled time point. On the other hand, when providing excessive transportation capacity by unnecessarily increasing the number of trains with focus given to a reduction of the degree of congestion, a service cost may increase and this may lead to disadvantages for the passengers due to fare rising.

Under the circumstances, a technology aimed to supply transportation capacity suitable for demand for every time period is disclosed in Patent Document 1. In the technology disclosed in Patent Document 1, the appropriate number of trains is calculated on the basis of predicated demand for every time period of a representative section of a target line, and the calculated appropriate number of trains and the number of trains currently operating are compared with each other. In a case where the actual number of trains is greater than an appropriate number, turn-around time is lengthened to decrease operating density, and in a case where the actual number of trains is less than the appropriate number, the turn-around time is shortened to increase the operating density, thereby supplying transportation capacity suitable for demand for every time period.

CITATION LIST

Patent Document

Patent Document 1: JP 9-123913 A

SUMMARY OF THE INVENTION

Problems to be Solved by the Invention

The technology disclosed in Patent Document 1 relates to adjustment of the operating density only with adjustment of the turn-around time, and thus it is difficult to secure transportation capacity suitable for demand in a case where a sufficient number of vehicles are not present with respect to a line length. For example, in a case where one hour is taken to travel from one end to the other end of a line, 40 vehicles are required for reciprocation in order to operate at three-minute intervals. At this time, the number of railway users is predicted to increases, for example, due to an influence of the weather, and when it is desired to operate one hour at two-minute intervals during rush hour, the adjustment of the turn-around time is not enough for the number of vehicles required. Accordingly, it is necessary to increase the number of trains by using spare vehicles. Here, in a case where it is difficult to secure the number of vehicles enough for the number of trains to be increased, it is difficult to actually increase the number of trains, and it is difficult to obtain desired operating density. Note that, as a reason for the difficulty in securement of the required number of vehicles, in addition to a case where spare vehicles are physically deficient, delay in detection of a variation of demand, a case where time required to transport a vehicle from a vehicle base (depot) to a starting station of a train to be increased is lack, and the like are considered. There is a demand for supplying transportation capacity that is suitable for movement demand (that is, equalizes the degree of congestion) in more situations in comparison to the related art.

According to examinations of the present inventors, the degree of congestion is likely to increase in an extremely partial section in the line for every time period such as a section from a station near an event position to a station connecting to other lines in many cases.

An object of the invention is to provide a technology capable of supplying transportation capacity suitable for movement demand in many situations.

Solutions to Problems

To accomplish the object, according to an aspect of the invention, there is provided a timetable modification device that changes a timetable indicating a train control target in correspondence with a movement demand prediction result indicating a destination of passengers and the number of the passengers in each station at which a train stops for every time period. The timetable modification device includes: a violation position extraction unit that calculates the degree of congestion of the train on the basis of predicted demand information indicating the movement demand prediction result, and extracts a violation position at which the degree of congestion is out of a predetermined allowed range; and a timetable correction unit that changes the timetable so as to include a change of the destination of the train so that the degree of congestion of the violation position is within the allowed range or so that the degree of congestion of the violation position approaches the allowed range.

Effects of the Invention

According to the invention, it is possible to supply transportation capacity suitable for movement demand for every time period in more situations in comparison to the related art.

BRIEF DESCRIPTION OF THE DRAWINGS

FIG. 4A is a view describing the contents of platform use order information in resource use order information created by the target timetable modification device illustrated in FIG. 1.

FIG. 4B is a view describing the contents of inter-station track use order information in the resource use order information created by the target timetable modification device illustrated in FIG. 1.

FIG. 6B is a view describing the contents of timetable state information included in the timetable change pattern information illustrated in FIG. 6A.

FIG. 6C is a view describing the contents of post-change train group information included in the timetable change pattern information illustrated in FIG. 6A.

FIG. 7 is a view for describing the contents of number-of-people-waiting-for-train information stored in a storage unit provided in the target timetable modification device illustrated in FIG. 1.

FIG. 8 is a view for describing the contents of number-of-train-passengers information stored in the storage unit provided in the target timetable modification device illustrated in FIG. 1.

FIG. 11 is a flowchart for describing a detailed operation in timetable correction necessity and non-necessity determination processing illustrated in FIG. 10 among the operations of the target timetable modification device illustrated in FIG. 1.

FIG. 12 is a flowchart for describing a detailed operation in target timetable correction processing illustrated in FIG. 10 among the operations of the target timetable modification device illustrated in FIG. 1.

FIG. 13 is a flowchart for describing a detailed operation in timetable change prohibited train specifying processing illustrated in FIG. 12 among the operations of the target timetable modification device illustrated in FIG. 1.

FIG. 17 is a flowchart for describing a detailed operation in candidate timetable creation processing illustrated in FIG. 12 among the operations of the target timetable modification device illustrated in FIG. 1.

MODE FOR CARRYING OUT THE INVENTION

Embodiment

Hereinafter, an embodiment of the invention will be described in detail.

In this embodiment, a target timetable modification device that creates a target timetable that is a target timetable of train control on a railway line on which a train automatically runs is provided. The target timetable modification device updates the target timetable in accordance with predicted movement demand at every moment. This is an example suitable for application in a case where the system predicts the movement demand at the inside of the system, and evaluates that the target timetable is to be optimally changed by using which pattern among timetable change patterns stored in timetable change pattern database on the basis of the predicted movement demand.

Figure 1:
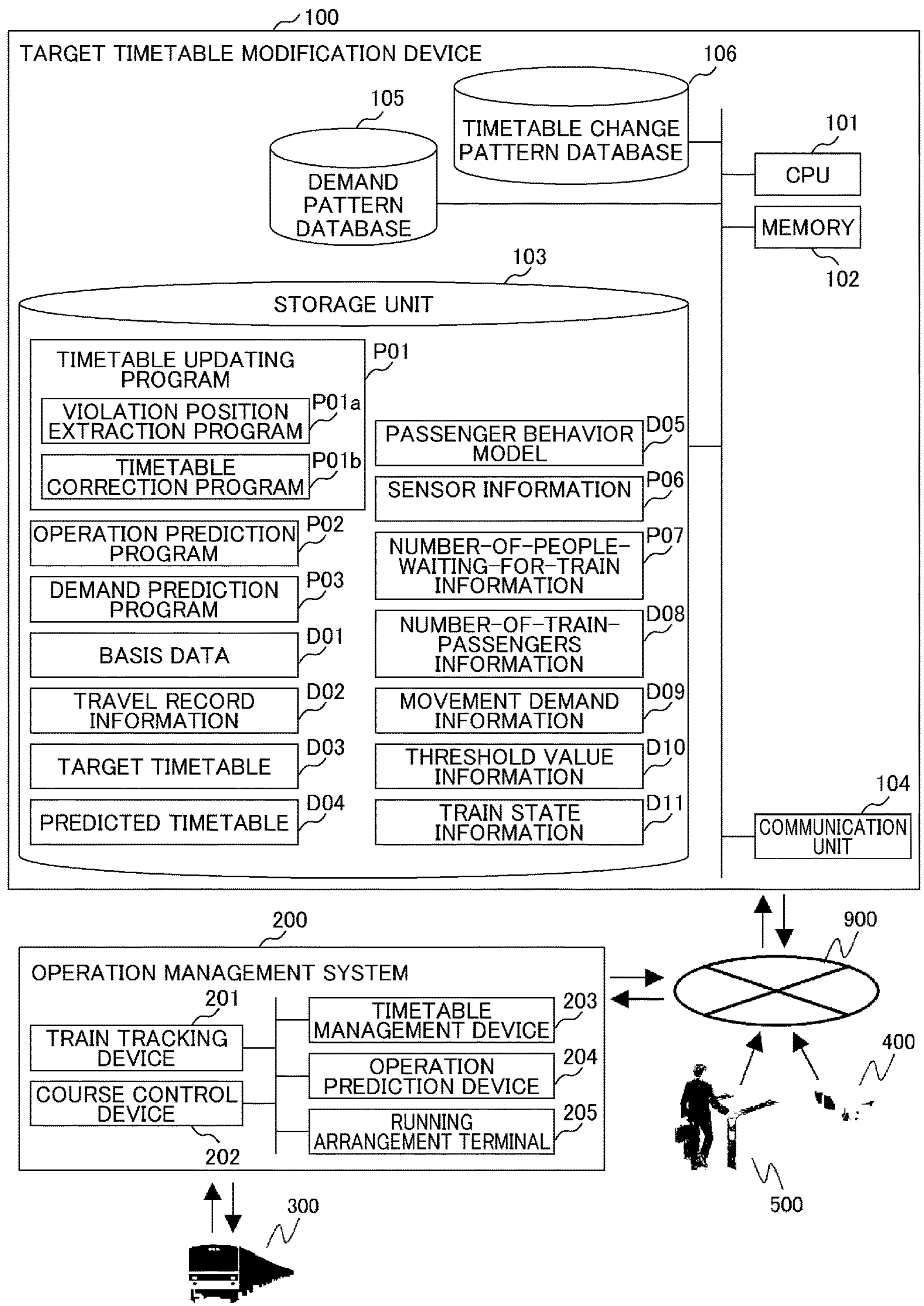
FIG. 1 is a block diagram of a vehicle automatic control system according to an embodiment.

FIG. 1 is a block diagram of a vehicle automatic control system according to the embodiment.

As illustrated in FIG. 1, the vehicle automatic control system according to this embodiment includes a target timetable modification device 100, an operation management system 200, and sensors 400 and 500. As an example, the sensor 400 is a monitoring camera, and the sensor 500 is an automatic ticket gate. The target timetable modification device 100 is connected to the operation management system 200 through a communication network 900 in a communication possible manner. The sensors 400 and 500 are also connected to the communication network 900. The target timetable modification device 100 can collect sensor information from the sensor 400 and 500.

The target timetable modification device 100 appropriately updates the target timetable so as to supply transportation capacity suitable for movement demand for every section between stations and for every time period on the basis of information stored in the device, information acquired from the operation management system 200, and sensor information acquired from the sensors 400 and 500, and notifies the operation management system 200 the target timetable.

The operation management system 200 controls operation of a plurality of trains 300 in a train operation network that is a management target in accordance with the target timetable given in notification from the target timetable modification device 100. Each of the trains 300 automatically runs in accordance with control from the operation management system 200. The operation management system 200 also acquires various pieces of information from the train 300 and manages the operation of the train 300. The operation management system 200 notifies the target timetable modification device 100 of various pieces of information including the information acquired from the train 300.

The target timetable modification device 100 includes a CPU 101, a memory 102, a storage unit 103, a communication unit 104, a demand pattern database 105, and a timetable change pattern database 106.

The central processing device (CPU) 101 is a processor that executes various software programs stored in the storage unit 103. The memory 102 is a storage device that becomes a work region of the CPU 101. The CPU 101 writes data in the memory 102 or reads out data therefrom when executing the software programs.

The storage unit 103 is a storage device that stores the various programs executed by the CPU 101, and various pieces of data used in processing by the CPU 101.

The communication unit 104 is connected to the communication network 900 and enables communication through the communication network 900 by the target timetable modification device 100.

The demand pattern database 105 is database that stores a past history of the movement demand and a record of the movement demand is additionally stored in the database at every moment. The movement demand is data (OD data) indicating destinations of passengers in each time period at each station and the number of the passengers, that is, how many passengers desire where to go in each time period of each station. It is possible to understand characteristics, seasonal fluctuations, and the like of each day of the week from a past history of the movement demand. The past history of the movement demand is used in prediction of future movement demand by using a demand prediction program P03.

The timetable change pattern database 106 is a database that stores timetable change pattern information indicating various timetable change patterns determined in advance. The timetable change pattern is used to change the timetable.

The storage unit 103 stores a timetable updating program P01, an operation prediction program P02, the demand prediction program P03, basis data D01, travel record (running result) information D02, a target timetable D03, a predicted timetable D04, a passenger behavior model D05, sensor information D06, number-of-people-waiting-for-train information D07, number-of-train-passengers information D08, movement demand information D09, threshold value information D10, and train state information D11.

The timetable updating program P01 is a software program that is executed by the CPU 101 to realize timetable updating processing. The timetable updating processing is processing of updating the target timetable so that the degree of congestion becomes an allowed range or the degree of congestion approaches the allowed range in correspondence with predicted movement demand (however, in a case where tradeoff exists, that is, when desiring to make the degree of congestion of an arbitrary position be closer to the allowed range, the degree of congestion of another position deviates from the allowed range, the target timetable is updated so that a value of an evaluation index to be described later becomes better). The degree of congestion includes the degree of congestion of a train, and the degree of congestion of a station. The degree of congestion of the train is an index indicating a ratio of the number of boarding people to the number of boarding possible people of the train. The degree of congestion of the station is an index indicating a ratio of the number of passengers who are in a station premise or a platform to the number of passengers capable of being accommodated in the station premise or the platform. The allowed range is a range of the degree of congestion at which a train is permitted to operate without changing the target timetable, and is defined as target degree-of-congestion information in threshold value information D10 to be described later. In this embodiment, with regard to a configuration of the allowed range, an upper limit and a lower limit which are always constant are used, but the embodiment of the invention is not limited thereto. With regard to the allowed range, different values may be set between weekdays and holidays, a different value may be set for every time period (in this case, determination of the inside or the outside of the allowed range is made on the basis of a train departure time point), a different value may be set for every location, or these may be combined. In timetable updating processing, results of operation prediction processing and demand prediction processing are used. Details of the timetable updating processing will be described later.

The timetable updating program P01 includes a violation position extraction program P01*a* and a timetable correction program P01*b*. The violation position extraction program P01*a* is a software program that is executed by the CPU 101 to realize processing of extracting a violation position. The violation position is a position at which the degree of congestion is out of the allowed range. The "position" stated here is expressed by a set of a train and a section between adjacent train travelling stations (hereinafter, the "section between stations" is used to mean "section between train travelling stations" unless otherwise stated). The timetable correction program P01*b* is a software program that is executed by the CPU 101 to realize processing of correcting the timetable. The target timetable is corrected to improve the violation position. However, in a case where tradeoff exists, that is, when desiring to make the degree of congestion of an arbitrary position be closer to the allowed range, the degree of congestion of another position deviates from the allowed range, the target timetable is corrected so that a value of an evaluation index to be described later becomes better as described above.

When the CPU 101 executes the timetable updating program P01, a timetable updating unit (not illustrated) is constructed in the target timetable modification device 100. When the CPU 101 executes the violation position extraction program P01*a*, a violation position extraction unit (not illustrated) is constructed in the target timetable modification device 100. When the CPU 101 executes the timetable correction program P01*b*, a timetable correction unit (not illustrated) is constructed in the target timetable modification device 100. In the following description, the timetable updating program P01, the violation position extraction program P01*a*, and the timetable correction program P01*b* are described as an execution subject of each processing, but the CPU 101 may be set as the execution subject, and the timetable updating unit, the violation position extraction unit, and the timetable correction unit may be set as the execution subject.

The operation prediction program P02 is a software program that is executed by the CPU 101 to realize operation prediction processing. The operation prediction processing is processing of predicting a future operation situation of a train group in the train operation network on the basis of the basis data D01, the travel record information D02 (record timetable), and the target timetable D03, and generating a predicted timetable. When the CPU 101 executes the operation prediction program P02, an operation prediction unit (not illustrated) is constructed in the target timetable modification device 100. In the following description, the operation prediction program P02 is described as an execution subject of the operation prediction processing, but the CPU 101 may be set as the subject of the operation prediction processing, or the operation prediction unit may be set as the subject of the operation prediction processing. The operation prediction processing can be carried out by using a known technology (for example, a train operation simulation by a macro model).

The demand prediction program P03 is a software program that is executed by the CPU 101 to realize demand prediction processing. The demand prediction processing is processing of predicting a future movement demand on the basis of a past history of the movement demand, a given timetable, and information of various sensors relating to movement of passengers, and generating predicted demand information including movement demand information. The demand prediction processing is processing of predicting a future movement situation of passengers on the basis of the past history information of the movement demand which is registered in the demand pattern database 105, the basis data D01, the predicted timetable D04, the passenger behavior model D05, and the sensor information D06, and generating the number-of-people-waiting-for-train information D07, the number-of-train-passengers information D08, and the movement demand information D09. When the CPU 101 executes the demand prediction program P03, a demand prediction unit (not illustrated) is constructed in the target timetable modification device 100. In the following description, the demand prediction program P03 is described as an execution subject of the demand prediction processing, but the CPU 101 may be set as the subject of the demand prediction processing, or the demand prediction unit may be set as the subject of the demand prediction processing. The demand prediction processing can be carried out by using a known technology.

The basis data D01 is information relating to equipment which is commonly used in programs. For example, the basis data D01 includes data such as equipment identification information (a station ID, a platform ID, a track ID, or the like), route information (information relating to the order of stations for every route and for every upward or downward direction, a platform that is used, a track that is used, whether to stop at each station or to pass the station, or the like), turn-around equipment information, time information (reference running time, minimum stop time, continuation interval, or the like), capacity information of each train set (each vehicle) that constitutes a train, or the like. The station ID is identification information for identifying each station, and the platform ID is identification information for identifying each platform of the station, and the track ID is identification information for identifying each track between adjacent stations. The route information is information that defines a route on which a train can travel on a railway, and is composed to include information of the order of stations, a platform that is used, and a track that is used for every line and for every upward or downward direction. The turn-around equipment information is composed to include information indicating that a train can turn around at which station on a travel route. The reference running time is minimum time required by an arbitrary train from departure from an arbitrary station to arrival at a next station, and a value corresponding to a section between adjacent stations is calculated by using a train travel simulator or the like and is stored. Note that, a standard value of time taken by an arbitrary train from departure from an arbitrary station to arrival at a next station may be used as the reference running time in consideration of margin time. In a case where an arbitrary train stops at an arbitrary station, the minimum stop time is minimum time required for the train from arrival at the station to departure from the station. A common value may set to all stations of all trains, or a different value may be used in correspondence with a time period or the degree of congestion.

The travel record information D02 is information indicating a record of when each train arrives at or departs from which place.

The target timetable D03 is timetable information that is set as a control target of a train group. In a railway field, the terminology of "timetable" may represent a train operation plan and a train operation table illustrating the train operation plan in a diagram, but in this specification, the "timetable" is used to represent the former, that is, the train operation plan. The target timetable D03 is configured to include station order information indicating that each train travels sequentially through which stations, information of an arrival time point and a departure time point of each station, information indicating which platform is to be used at each station, information indicating that the train travels on which track in a section between adjacent stations, and information indicating whether the train stops at or passes through each station in the order of stations, and is configured to include information indicating that which train and which train are physically operated with the same train set (vehicle). Note that, in a case where there is a possibility that the same train may use the same station a plurality of times, a number-of-times identifier suffix for discriminating how many times the station is used is applied to the station order information. That is, the configuration is made so that an arrival event and a departure event of the train can be uniquely specified by a set of the train ID, the station ID, and the suffix. The target timetable D03 is appropriately updated by the target timetable modification device 100. In train control using the target timetable D03, a travelling order of trains using the same platform or the same track is based on the assumption that a traveling order shown in the target timetable D03 is observed, and even in the operation prediction program P02, a future operation situation of a train group is predicted on the basis of the assumption (that is, an occurrence time point of the arrival event and an occurrence time point of the departure event at each station of each train are predicted).

The predicted timetable D04 is a timetable of a result obtained by predicting that an arrival time point at each station and a departure time point from each station in a case where the train travel on the basis of the target timetable D03 actually become which time points.

The passenger behavior model D05 is a model that simulates the behavior of passengers who use a railway. Examples of the passenger behavior model D05 include a train selection model that simulates which train is selected by a passenger in a station, and the like. As the passenger behavior model D05, a model that is modeled on the basis of a past behavior record of the passenger may be set, or a model obtained by modeling a behavior of the passenger assumed on the basis of enquete conducted in advance, and the like may be set. The passenger behavior model D05 is used by the demand prediction program P03 in demand prediction processing.

The sensor information D06 is information acquired by the various sensors 400 and 500. For example, the sensor 400 and 500 are disposed to detect the behavior of the passenger, the sensor information D06 is used by the demand prediction program P03 in the demand prediction processing. Examples of the sensor information D06 include a part or the entirety of the following information.

Wireless LAN connection information (information obtained by recording a connection situation to the wireless LAN by a portable terminal of the passenger)

Monitoring camera video information (information of a video photographed with a monitoring camera provided in a station premise)

Number-of-people-passing-through-train-door information (information of the number of people who pass through a train door)

Number-of-people-passing-through-platform-door information (information of the number of passengers who pass through a door provided in a station platform)

Ticket-gate-passing-passenger information (information relating to passengers passing through an automatic ticket gate in a station)

Various pieces of open information (news and the like)

The number-of-people-waiting-for-train information D07 is information indicating that how many passengers wait for a train at each platform of each station at each time point. The number-of-people-waiting-for-train information D07 is a predicted result by the demand prediction program P02. Details of the number-of-people-waiting-for-train information D07 will be described later.

The number-of-train-passengers information D08 is information indicating how many passengers who board on each train that is travelling in a section between respective stations. The number-of-train-passengers information D08 is a predicted result by the demand prediction program P02. Details of the number-of-train-passengers information D08 will be described later.

The movement demand information D09 is information indicating how many passengers desire where to go in each time period of each station. The movement demand information D09 is a predicted result by the demand prediction program P02. Details of the movement demand information D09 will be described later. Details of the movement demand information D09 will be described later.

The threshold value information D10 is information of various threshold values which are used in the timetable updating processing by the timetable updating program P01. The threshold value information D10 is configured to include target-degree-of-congestion information and maximum-waiting-time information. The target-degree-of-congestion information is information indicating a range permitted as the degree of congestion, and an upper limit and a lower limit thereof are defined. The degree of congestion is an index indicating a ratio of an actual number of boarding people to the number of boarding possible people of the train (may be greater than seating capacity) as capacity of the train, and is calculated for every section between adjacent stations in which the train travels. The maximum-waiting-time information is information indicating the maximum time permitted for causing a passenger to wait at a station. Note that, in this embodiment, in a case where trains of which destinations are different are operation in a mixed state in an arbitrary station, the waiting time is calculated on the assumption that the passenger does not get on a train for a destination with which the passenger cannot reach own destination, and waits a next train. Accordingly, in this case, there is a possibility that the waiting time of the passenger may be longer than an operation interval of a train (simple interval that does not consider the destination).

The train state information D11 is information indicating that each train currently exists in which state at which place. The target timetable modification device 100 updates the train state information D11 on the basis of the information of each train 300 which is given in notification from the operation management system 200. With regard to a train that is travelling in a main line, it is possible to understand a state as the travel record information D02, and thus a state such as "standby" and "power-off" is managed with respect to a train on a staying strap or in a vehicle base. Due to the difference between the states, in the case of using the train in accordance with timetable change such as train addition, preparation time necessary for the travel to be used becomes different, and thus the preparation time in each of the states is included in time information of the basis data D01.

The operation management system 200 includes a train tracking device 201, a route setting device 202, a timetable management device 203, an operation prediction device 204, and a running arrangement terminal 205.

The train tracking device 201 acquires current state information and current position information as a travel record given in notification from the train 300 that is operating, and tracks a state and a position of the train 300. The operation management system 200 notifies the target timetable modification device 100 of the train state information D11 that is obtained by the tracking and indicates that each train currently exists at which place in which state.

The course control device 202 controls a switch, a traffic signal, and the like which are disposed in a station and a track of a railway in accordance with operation of the train 300 according to the target timetable, and controls the route of the train 300.

The timetable management device 203 manages the target timetable acquired from the target timetable modification device 100, a record timetable obtained from the information acquired by the train tracking device 201, and a predicted timetable calculated on the basis of the target timetable and the record timetable. In addition, the timetable management device 203 notifies the train 300 of the target timetable, and sets the target timetable as an automatic running input of the train 300.

The operation prediction device 204 calculates the predicted timetable on the basis of the record timetable calculated on the basis of the target timetable obtained from the target timetable modification device 100 and the travel record acquired by the train tracking device 201.

The running arrangement terminal 205 is a terminal device for changing the timetable by a manager in order to return the train 300 to normal operation when timetable disruption occurs due to an accident, or the like.

According to the vehicle automatic control system configured as described above, in the course control device 202, the train is controlled by using a first timetable that is set as a train control target, and the travel record of the train controlled by the course control device 202 is acquired by the train tracking device 201, and the predicted timetable that is a result obtained by predicting the train operation by using the first timetable and the travel record is created by the operation prediction program P02. In addition, in the demand prediction program P03, the movement demand indicating a passenger's destination in each station at which the trains stop and the number of passengers for every time period is predicted by using the information relating to the number of passengers which is acquired from the sensors 400 and 500 and the predicted timetable, and predicted demand information indicating a movement demand prediction result is created. In the timetable updating program P01, the degree of congestion of at least one of the train or a station is calculated by using the predicted timetable and the predicted demand information, a violation position at which the degree of congestion is out of a predetermined allowed range is extracted, a second timetable including a change of a destination of the train from the first timetable is generated so that the degree of congestion of the violation position is within the allowed range, or so that the degree of congestion of the violation position approaches the allowed range, and the first timetable is updated by the second timetable.

Next, an overview of the operation of the above-described vehicle automatic control system will be described.

Figure 2:
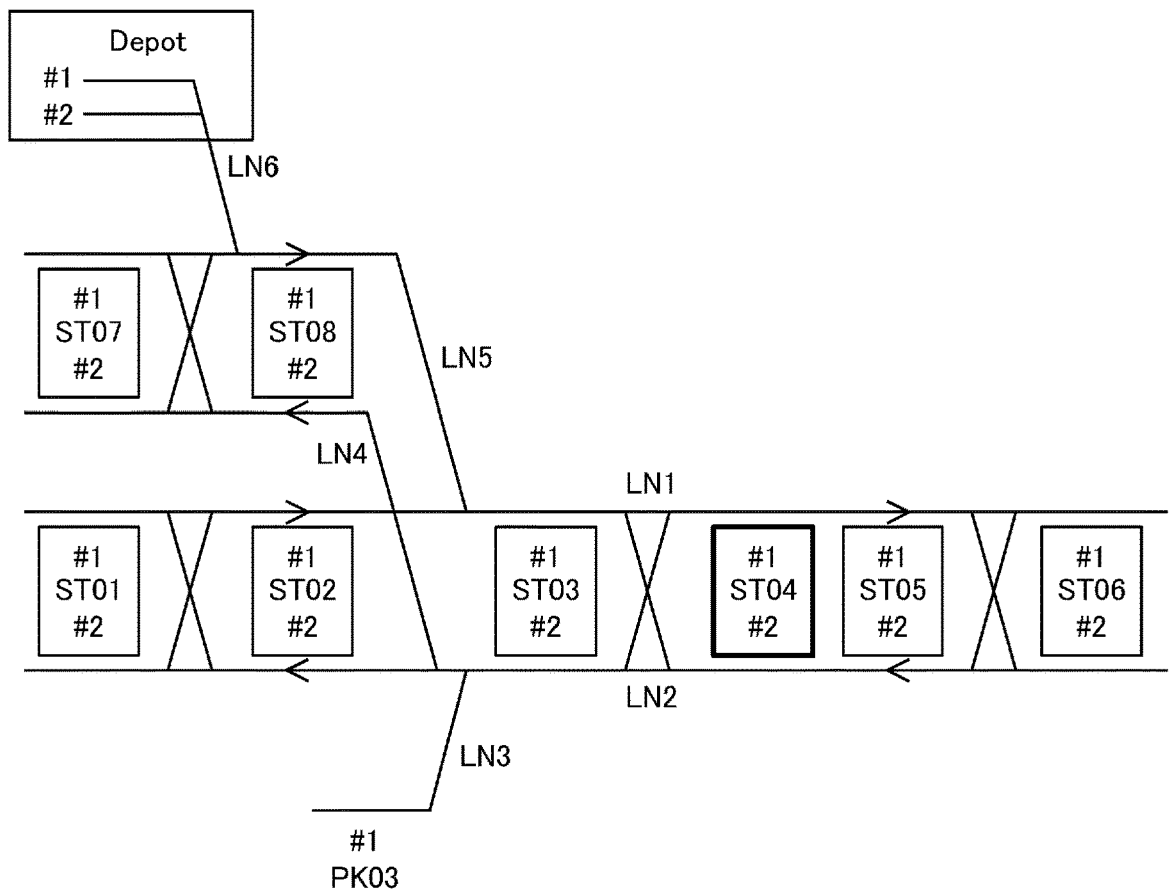
FIG. 2 is a view for describing an overview of an operation of the vehicle automatic control system illustrated in FIG. 1.

FIG. 2 is a view for describing an overview of the operation of the vehicle automatic control system illustrated in FIG. 1. In FIG. 2, an example of a railway wiring diagram for explaining operation is illustrated.

In FIG. 2, ST01 to ST08 represent a station, and Depot represents a vehicle base, and PK03 represents a staying strap. LN1 to LN6 represents a track. An arrow on the track represents a train advancing direction. #n (n is a digit number) represents a platform number.

One train set can stay on staying strap PK03. A train can move in a section between Platform 2 of the station ST03 and the staying strap PK03 through the track LN3. According to this, entrance and exiting of the train to and from the staying strap PK03 becomes possible.

In addition, in the station ST03, a train incoming from the station ST06 can turn around to toward the station ST06 without using the track LN3.

A plurality of train sets can stand by in the vehicle base Depot. However, the longer a distance from the station ST08 to the station ST03 is, for example, the longer time is taken to move a train set to be used in an increased train from the vehicle base Depot to the station ST03 is.

The station ST03 and the station ST06 are stations at which a passenger can transfer to a train on another line (not illustrated).

Here, a situation in which an irregular event in which many people gather at the station ST04 is performed and a termination time point of the event is not known is assumed. After event termination, it is expected that movement demand to the station ST03 that is a transfer station from the station ST04 in which the event is performed, and movement demand from the station ST04 to the station ST06 become higher. At this time, the vehicle automatic control system is required to promptly respond to a fluctuation in the movement demand on the day and to change the transportation capacity.

Figure 3A:
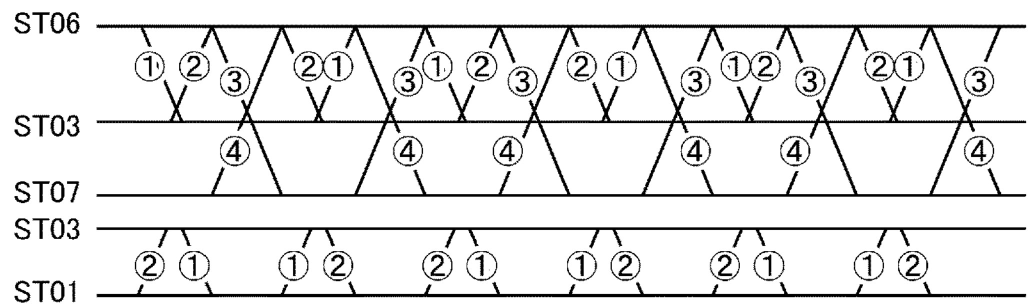
FIG. 3A is a view describing a timetable change pattern stored in a timetable change pattern database provided in a target timetable modification device illustrated in FIG. 1.
Figure 3B:
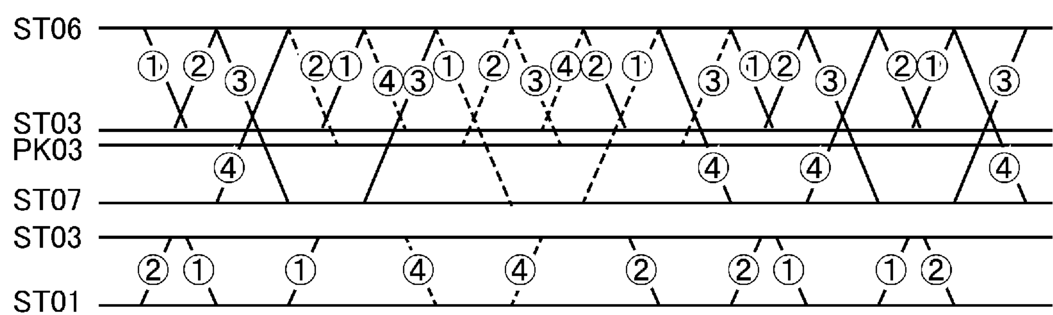
FIG. 3B is a view describing the timetable change pattern stored in the timetable change pattern database provided in the target timetable modification device illustrated in FIG. 1.
Figure 3C:
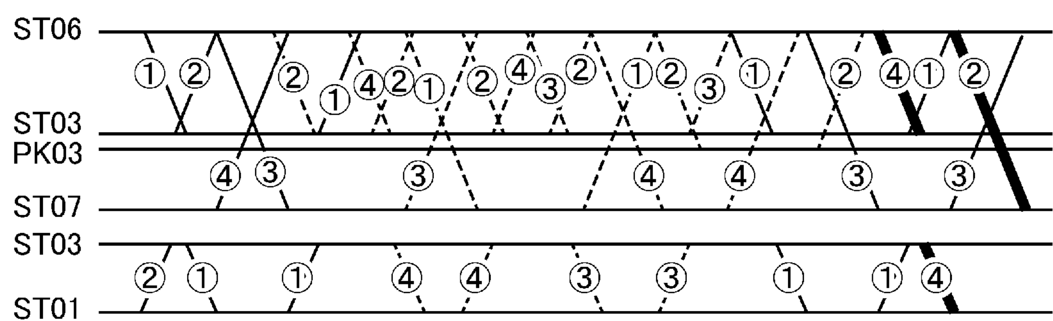
FIG. 3C is a view describing the timetable change pattern stored in the timetable change pattern database provided in the target timetable modification device illustrated in FIG. 1.

FIG. 3A, FIG. 3B, and FIG. 3C are views describing the timetable change patterns stored in the timetable change pattern database 106 provided in the target timetable modification device 100 illustrated in FIG. 1. FIG. 3A illustrates a timetable before timetable correction, FIG. 3B illustrates a timetable that is corrected by a timetable change pattern to lower operation density of a section in which the degree of congestion is low, and FIG. 3C illustrates a timetable that is corrected by a timetable change pattern to raise the operation density of a section in which the degree of congestion is high while lowering the operation density of a section in which the degree of congestion is low.

In FIG. 3A, FIG. 3B, and FIG. 3C, a digit that is applied to only a train line that indicates train operation with an inclined line is an identification number of a train set, and a train set (vehicle) that is physically the same is used for a train of the same identification number.

The station ST04 that is a station near the event is not illustrated in FIG. 3A, FIG. 3B, and FIG. 3C, but the station ST04 exists between the station ST03 and the station ST06 as illustrated in FIG. 2.

In an initial state, the train 300 operates in accordance with an original target timetable (that is, the target timetable before timetable correction) as illustrated in FIG. 3A. When referring to FIG. 3A, twelve trains operate in both directions between the station ST03 and the station ST06. In addition, six trains operate in both directions between the station ST03 and the station ST07. In addition, six trains operate in both directions between the station ST03 and the station ST01.

Here, in demand prediction by the target timetable modification device 100, it is assumed that the degree of congestion of the train between the station ST03 and the station ST06 is predicted to be within the allowed range before the event is performed or during the event. On the other hand, it is assumed that few passengers use a train between the station ST03 and the station ST07 and between the station ST03 and the station ST01, and the degree of congestion is predicted to be lower than a lower limit of the allowed range. In this case, the target timetable modification device 100 corrects the target timetable to lower the train operation density between the station ST03 and the station ST07 and between the station ST03 and the station ST01.

The target timetable modification device 100 retains timetable change pattern information indicating "in a case where a part of the target timetable before correction matches a predetermined structure, how to correct a structure of the part so that the target timetable can be corrected while ensuring execution possibility" in advance. Accordingly, in correction of the target timetable, the target timetable modification device 100 may select and apply a timetable change pattern in which the degree of congestion becomes within the allowed range or approaches the allowed range among applicable timetable change patterns.

FIG. 3B illustrates a target timetable in which the train operation density is lowered between the station ST03 and the station ST07, and between the station ST03 and the station ST01. A broken inclined line represents a train line for which timetable correction is performed. When referring to FIG. 3B, twelve trains operate in both directions between the station ST03 and the station ST06 as in the initial state. On the other hand, five trains less than in comparison to the initial state by one operate in both directions between the station ST03 and the station ST07. In addition, five trains less than in comparison to the initial state by one operate in both directions between the station ST03 and the station ST01.

In comparison to the target timetable in FIG. 3A, in the target timetable in FIG. 3B, trains in a single section (between ST03 and ST01) where the station is vacant are skipped in operation, and an overall train travel distance is further shortened in comparison to an original train travel distance. In addition, unlike from a case where a train is simply suspended, the train operation interval in the single section (between ST03 and ST01) is shortened two times the original interval.

Alternatively, in the initial state, it is assumed that the event is early terminated, and an increase of movement demand from the station ST04 to the station ST03 and movement demand from the station ST04 to the station ST06 is predicted. Specifically, it is assumed that the degree of congestion of a train traveling from the station ST04 to the station ST03 and the degree of congestion of a train traveling from the station ST04 to the station ST06 exceed the upper limit of the allowed range in combination. In this case, the target timetable modification device 100 corrects the target timetable so that the train operation density increases between the station ST03 and the station ST06.

FIG. 3C illustrates a target timetable in which the train operation density between the station ST03 and the station ST07 and between the station ST03 and the station ST01 is lowered and the train operation density between the station ST03 and the station ST07 is raised. A broken inclined line represents train operation for which timetable correction is performed. In addition, a bold inclined line represents a train for which operation change is performed. When referring to FIG. 3C, five trains less than in comparison to the initial state by one operate in both directions between the station ST03 and the station ST07. In addition, five trains less than in comparison to the initial state by one operate in both directions between the station ST03 and the station ST01. On the other hand, thirteen trains greater in comparison to the initial state by one operate in both directions between the station ST03 and the station ST06. In a time period near an end (right end) in FIG. 3C, a vehicle operation change is made in accordance with a travel timing change of each train, and in two trains indicated by a bold line, a target timetable in which a train set (vehicle) that is used is replaced in comparison to the original target timetable is set.

In FIG. 3C, the train operation density in a common section (between ST03 and ST06) is further raised in comparison to FIG. 3A to mitigate congestion. So as to increase the transportation capacity by adding a train, it is necessary to move a vehicle from the vehicle base to a station or the like, and thus time is taken. In the timetable change pattern in FIG. 3C, it is possible to correspond to rapid change of the movement demand by raising the train operation density through change of the train destination.

As described above, according to this embodiment, the target timetable modification device 100 changes the target timetable that is a timetable indicating a train control target in accordance with a movement demand prediction result indicating destinations of passengers and the number of passengers in each time period in each station, that is, how many passengers desire where to go in each time period of each station. At this time, the violation position extraction program P01*a* calculates the degree of congestion of at least one of a train or a station on the basis of information (predicted demand information) indicating the movement demand prediction result, and extracts the violation position at which the degree of congestion is out of the allowed range. In addition, the timetable correction program P01*b* changes a timetable to include a change of a destination of a train so that the degree of congestion of the violation position is within the allowed range, or so that the degree of congestion of the violation position approaches the allowed range. Since the timetable change accompanied with a destination change of the train in the timetable is made on the basis of demand prediction, it is possible to supply the transportation capacity suitable for the movement demand in many situations.

Next, a detailed operation of the vehicle automatic control system illustrated in FIG. 1 will be described.

The target timetable modification device 100 acquires the latest target timetable that is currently applied from the operation management system 200, and creates resource use order information on the basis of the target timetable. The resource use order information is information indicating the order of trains which use a resource, that is, information indicating "which train travels by using a resource such as a platform and an inter-station track prior to which train". The resource use order information includes a platform use order information and inter-station track use order information.

FIG. 4A is a view describing the contents of the platform use order information in the resource use order information created by the target timetable modification device 100 illustrated in FIG. 1.

As illustrated in FIG. 4A, a station ID, a platform ID, and a train ID are included in respective records of platform use order information D12*a* created by the target timetable modification device 100 illustrated in FIG. 1. The station ID is identification information for individually identifying stations. The platform ID is identification information for individually identifying platforms in the same station. The train ID is identification information for individually identifying trains. The respective records of the platform use order information D12*a* illustrate that a platform indicated by the platform ID in a station indicated by the station ID is used by a train indicated by the train ID. In the platform use order information D12*a*, with regard to records in which a set of (station ID and platform ID) is the same in each case, the records are aligned in a time-series order (the order of using the platform earlier) from an upper side. For example, in the example in FIG. 4A, it can be understood that a platform #2 of a station ST03 is used in the order of a train TR002, a train TR004, a train TR006, The target timetable modification device 100 creates the platform use order information D12*a* by using a platform to be used in each station, an arrival time point at the station, and a departure time point from the station with respect to each train in the target timetable acquired from the operation management system 200, and retains the platform use order information D12*a*. The target timetable modification device 100 can understand that each platform in each station is to be used by each train in which order with reference to the platform use order information D12*a*.

Note that, when creating the platform use order information D12*a*, not only a platform of a station but also a vehicle base or a platform of a staying strap are also set as a target. That is, with regard to the platform of the vehicle base or the platform of the straying strap, the target timetable modification device 100 also manages the order of trains which uses the resource.

FIG. 4B is a view describing the contents of inter-station track use order information in the resource use order information created by the target timetable modification device 100 illustrated in FIG. 1.

As illustrated in FIG. 4B, an inter-station track ID, a departure station ID, and a train ID are included in respective records of inter-station track use order information D12*b* created by the target timetable modification device 100 illustrated in FIG. 1. The inter-station track ID is identification information for individually identifying tracks between adjacent stations. The departure station ID is identification information for identifying that which station is a departure station. The train ID is identification information for individually identifying trains. It is possible to understand the travel order of a train that uses each track between adjacent stations with reference to the inter-station track use order information D12*b*. The records of the inter-station track use order information D12*b* indicate that a train indicated by the train ID uses a track indicated by the inter-station track ID in a departure direction from a station indicated by the departure station ID. With regard to records in which the inter-station track ID is the same in each case, the inter-station track use order information D12*b* describes the records sequentially in the order of using the inter-station track from an upper side, and thus it is possible to understand the travel order of trains using each track between adjacent stations from the order of the records of the inter-station track use order information. For example, in the example in FIG. 4B, with respect to a section, which corresponds to the inter-station track ID (ST05-ST06-LN1), between a station ST05 and a station ST06 of a track LN1, it can be understood that a train TR001 uses the section first when departing from the station ST05, a train TR003 subsequently uses the section when departing from the station ST05, and then a train TR299 uses the section when departing from the station ST05. The target timetable modification device 100 creates the inter-station track use order information D12*b* by using a track to be used between adjacent stations, a departure time point from each station, and an arrival time point at the next station with respect to respective trains in the target timetable acquired from the operation management system 200, and retains the inter-station track use order information D12*b*. The target timetable modification device 100 can understand that each train uses each track between adjacent stations in which order with reference to the inter-station track use order information D12*b*.

Figures 5, 6A:
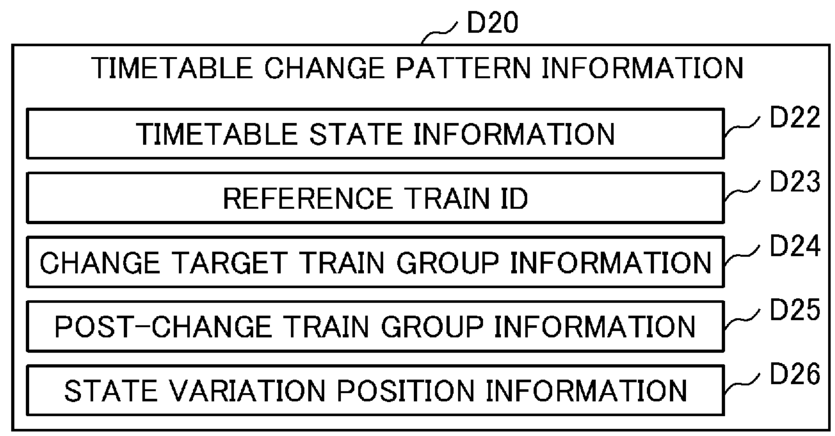
FIG. 5 is a view describing the contents of route information included in basis data retained by the target timetable modification device illustrated in FIG. 1.
FIG. 6A is a view describing the contents of timetable change pattern information stored in the timetable change pattern database provided in the target timetable modification device illustrated in FIG. 1.

FIG. 5 is a view describing the contents of route information included in basis data D01 retained by the target timetable modification device 100 illustrated in FIG. 1.

As illustrated in FIG. 5, a route ID, a station ID, a platform ID, a departure side track ID, and stoppage classification are included in respective records of route information D01*a* included in the basis data D01 retained by the target timetable modification device 100 illustrated in FIG. 1. The route ID is identification information for individually identifying respective routes. The station ID is identification information for individually identifying respective stations. The platform ID is identification information for individually identifying platforms in a station. The departure side track ID is identification information for individually identifying tracks along which a train passes from the platform in the station in each route. A predetermined exception value ("-" in FIG. 5) is set to the departure side track ID in a terminal station. The stoppage classification is a classification indicating whether a train stops at or passes through each station. With respect to a train using a route indicated by the route ID, respective records of the route information D01*a* indicate that the train stops at or passes through a station indicated by the station ID in accordance with the stoppage classification, and the train proceeds to a track indicated by the track ID from a platform indicated by the platform ID of the station. The route information D01*a* in FIG. 5 illustrates the same route ID in a time-series order from an upper side. For example, with regard to a train that travels on a route RR001, the train proceeds to a track LN2 from a platform #1 of a station ST06, passes through a platform #2 of a station ST05, stops at a platform #2 of a station ST04, and finally stops at a platform #2 of a station ST01. In addition, with regard to a train that travels on a route RT011, the train proceeds to a lead track of a track LN3 from a platform #2 of a station ST03, and finally stops at a platform #1 of PK03.

As described above, the route information D01*a* is information that specifies the station order from a departure station and a terminal station, a platform to be used, a track to be used, and stoppage classification, and all of patterns in which a train may travel are listed.

The target timetable modification device 100 can understand information of each route on which a train travels with reference to the route information D01*a*.

FIG. 6A is a view describing the contents of timetable change pattern information stored in the timetable change pattern database 106 provided in the target timetable modification device 100 illustrated in FIG. 1.

When referring to FIG. 6A, timetable change pattern information D20 stored in the timetable change pattern database 106 provided in the target timetable modification device 100 illustrated in FIG. 1 includes timetable state information D22, a reference train ID D23, a change target train group information D24, post-change train group information D25, and state variation position information D26.

The timetable state information D22 is information for specifying a before-change timetable state that becomes a timetable change condition, and the information is set by using a train ID that is locally defined in the timetable change pattern. Details thereof will be described later. The reference train ID D23 is information for specifying a train that is allocated to a focused violation position, and is designated by a train ID that is locally defined in the timetable change pattern. The target timetable modification device 100 associates the reference train ID D23 on the timetable change pattern to a train ID corresponding to the violation position focused on the target timetable to associates a train ID in the timetable change pattern and a train ID in the target timetable with each other. Specifically, a preceding train, a previous operation train, and a subsequent operation train may be traced from trains specified with the reference train ID on the timetable change pattern by using association of the train specified by the reference train ID on the timetable change pattern to the train corresponding to the violation position focused on the target timetable, and the trains may be associated with trains having the same relationship on the target timetable. A case where the association cannot be performed represents that the focused timetable change pattern cannot be applied to the focused violation position. The change target train group information D24 is a list of train IDs which are locally defined in the timetable change pattern, and when correcting the target timetable with the timetable change pattern, a train, which corresponds to a train described here, on the target timetable is deleted. The post-change train group information D25 is information of a newly added train when correcting the target timetable with the timetable change pattern, and information indicating that a train travelling on which route is caused to travel subsequently to which train by using the same train set (vehicle) as which train is set. In this manner, information other than a time point is specified, and thus retrieval of a timetable change plan that can be actually used in train control, that is, that can be executed becomes easy. Details thereof will be described later. The state variation position information D26 describes a degree-of-congestion reduction effect that is expected between respective stations in each train in the timetable state information with numerical values of "+1", "0", and "−1" in correspondence with how a running interval before and after target timetable correction varies. That is, the state variation position information D26 is composed of elements in the number corresponding to the number of inter-stations included in the timetable state information, and each of the elements includes information indicating what effect is expected for which inter-station and which train. With regard to the expected degree-of-congestion reduction effect, for example, setting may be made as follows. That is, in a case where the running interval is narrowed after the target timetable correction and the degree of congestion is expected to be reduced, the effect may be set to a negative value, and in a case where the running interval is broadened after the target timetable correction and the degree of congestion is expected to be raised, the effect may be set to a positive value. In addition, the setting may be made so that an absolute value of the degree-of-congestion reduction effect is greater, the degree-of-congestion reduction effect or the degree of rising of the degree-of-congestion becomes greater. The expected degree-of-congestion reduction effect may be obtained in advance after the demand prediction program P03 obtains a ratio of movement demand of each OD by using the demand pattern database 105.

FIG. 6B is a view describing the contents of timetable state information D22 included in the timetable change pattern information D20 illustrated in FIG. 6A. The timetable state information D22 is train group information before timetable change which becomes a premise condition of the timetable change.

As illustrated in FIG. 6B, a train ID, a route ID, a previous operation train ID, a subsequent operation train ID, a train attribute, a platform use order preceding train, and an inter-station track use order preceding train are included in respective records of the timetable state information D22 included in the timetable change pattern information D20 illustrated in FIG. 6A. Here, with regard to the platform use order preceding train and the inter-station track use order preceding train, with respect to a platform and an inter-station track which are used in a case where a train specified with the train ID travels on a route specified by the route ID, a train ID of a train that is higher than the corresponding train in the platform use order by one rank, and a train ID of a train that is higher than the corresponding train in the inter-station track use order by one rank are registered along the train order. That is, information relating to the first station in the station order is the platform use order preceding train (1) and the inter-station track use order preceding train (1), and information relating to the second station is the platform use order preceding train (2) and the inter-station track use order preceding train (2). In a similar manner, pieces of information to the final station in the station order are registered.

The train ID is identification information for individually identifying trains in the timetable change pattern. The timetable change pattern is not created in correspondence with an individual specific target timetable, and is defined as a general purpose pattern (that is, correspondence of a train in the timetable changer pattern to which train in the individual specific target timetable may be different depending on a situation), and thus the train ID is defined as a local train ID in the timetable change pattern. When performing timetable change on the basis of the timetable change pattern, a train ID corresponding table for associating the local train ID in the timetable change pattern and the train ID on the target timetable is obtained in correspondence with a focused violation position, and the train ID in the timetable change pattern is converted to an actual specific train ID with reference to the train ID corresponding table.

The route ID is identification information for identifying a route on which the train indicated by the train ID travels. The previous operation train ID is identification information of a train that has previously used a train set used in the train. The subsequent operation train ID is identification information of a train that subsequently uses the train set used in the train. As described above, the timetable change pattern is not created in correspondence with the individual specific target timetable, and thus a travel route of the train and a travel order are set by the timetable change pattern, but a departure time point is not set.

The train attribute is information indicating a train attribute before timetable change in the timetable change pattern and represents the role of the train in the timetable change pattern. The train attribute includes "change target", "preceding train", and "operation connection".

The "change target" represents a train in which operation change occurs by timetable change. Accordingly, when attempting to apply the timetable change pattern with respect to an arbitrary violation position, in a case where a timetable change prohibited train corresponds to the "change target", the timetable change pattern cannot be applied.

The "preceding train" represents a train that is not a change target and appears as a preceding train when uniquely determining a timetable before change or after change excluding a time point difference (that is, in a case where an arbitrary train travels on an arbitrary route, and a position such as a platform at which the route competition with another train occurs is present, when uniquely determining which train travels behind which train at the position). The preceding train is a train that is necessary for uniquely determining the timetable before or after change excluding the time point difference, and the timetable of the train is not changed with application of the timetable change pattern, and thus in the case of attempting to apply the timetable change pattern with respect to an arbitrary violation position, it is permitted that the timetable change prohibited train corresponds to the "preceding train".

The "operation connection" represents a train that is not a change target and appears as a previous operation train or a subsequent operation trains when uniquely determining a timetable before change or after change excluding a time point difference (that is, in a case where an arbitrary train travels on an arbitrary route, and a position such as a platform at which route competition with another train occurs is present, when uniquely determining which train travels behind which train at the position). The operation connection relates to a train that is necessary for uniquely determining the timetable before or after change excluding the time point difference, and the timetable of the train is not changed with application of the timetable change pattern, and thus in the case of attempting to apply the timetable change pattern with respect to an arbitrary violation position, it is permitted that the timetable change prohibited train corresponds to the "operation connection". In addition, matching of information except for information of a station that is connected to the before-change timetable from the post-change timetable may not be established.

The platform use order preceding train is identification information (train ID) of a train that uses a platform used in a station in which the corresponding train exists in a rank higher than the corresponding train by one rank. For example, in a case where the train ranks third in the platform use order relating to the platform (that is, in the case of using the platform third), identification information of a train that ranks second in the platform use order is registered. The platform use order preceding train is set to be specified for every platform of a station that is used by the train. Accordingly, in FIG. 6B, in the order of stations through which a train specified by the train ID travels, the platform use order preceding train in the platform used by the train in the station is described by applying an identification number of (1), (2), . . . , or the like. For example, with respect to a train of which the train ID is PTR004, a platform use order preceding train in a second station in the station order becomes PTR002 described as a platform use order preceding train (2).

The inter-station track use order preceding train is identification information (train ID) of a train that uses an inter-station track to be used when departing from a station in which the corresponding train exists in a rank higher than the corresponding train by one rank. For example, in a case where the train ranks third in the inter-station track use order relating to the inter-station track (that is, in the case of using the inter-station track third), identification information of a train that ranks second in the inter-station track use order is registered. The inter-station track use order preceding train is set to be specified for every inter-station track that is used by the train when departing from the station that is used. Accordingly, in FIG. 6B, in the order of stations through which a train specified by the train ID travels, the inter-station track use order preceding train of the inter-station track to be used when the train departs from the station is described by applying an identification number of (1), (2), . . . , or the like.

Note that, in a case where passing and single-track bidirectional travel are not possible due to track wiring, the use order may be registered by collectively setting a plurality of the platforms as a target resource of the platform use order preceding train or a plurality of the inter-station tracks as a target resource of the inter-station track use order preceding train in a lump.

In addition, a predetermined exception value representing “with no preceding train” may be stored in an item of the platform use order preceding train or the inter-station track use order preceding train of a train that uses each of the resource for the first time. In addition, a predetermined exception value representing “Don’t Care” is stored in items of the platform use order preceding train and the inter-station track use order preceding train of a train that appears as a preceding train. Here, the reason why the predetermined exception value representing “Don’t Care” is stored is because the information is information that is not used in creation of a train ID corresponding table to be described later. Note that, in FIG. 6B, the case of “without a preceding train” and the case of “Don’t Care” are described as “-”.

In this manner, since the timetable change pattern includes train travel route information after timetable change as described above, it is possible to easily select an appropriate pattern corresponding to movement demand of “how many passengers who desire to go which station at which time period of which station”.

FIG. 6C is a view describing the contents of post-change train group information D25 included in the timetable change pattern information D20 illustrated in FIG. 6A. The post-change train group information D25 is train group information after timetable change.

As illustrated in FIG. 6C, a train ID, a route ID, a previous operation train ID, a subsequent operation train ID, a platform use order preceding train, and an inter-station track use order preceding train are included in respective records of the post-change train group information D25 included in the timetable change pattern information D20 illustrated in FIG. 6A.

The train ID is identification information for individually identifying trains in the timetable change pattern, and is locally defined in the timetable change pattern. The timetable change pattern is not created in correspondence with an individual specific target timetable, and is defined as a general purpose pattern, and thus the local train ID is defined in the timetable change pattern. When performing timetable change on the basis of the timetable change pattern, the train ID in the timetable change pattern is converted to an actual specific train ID.

The route ID is identification information for identifying a route on which a train travels. The previous operation train ID is identification information of a train that has previously used a train set used in the corresponding train. In a case where the train set of the corresponding train is not previously used, a predetermined exception value is set. For example, this case corresponds to a case where the corresponding train is a train that uses the train set released from the vehicle base for the first time. The subsequent operation train ID is identification information of a train in which the train set used in the corresponding train is subsequently used. In a case where the train set of the corresponding train is not subsequently used, a predetermined exception value is set. For example, this case corresponds to a case where the train set used in the train enters the vehicle base. It is assumed that route information is described also with respect to entry of exit of the train to and from the vehicle base or the straying strap. As described above, the timetable change pattern is not created in correspondence with an individual specific target timetable, and thus a route on which the corresponding train travels and a travel order is set by the timetable change pattern, but a departure time point is not set.

The platform use order preceding train is identification information of a train that uses a platform before the corresponding train uses a target platform. The platform use order preceding train is set for every platform of a station that is used by the corresponding train. In FIG. 6C, identification number of (1), (2), . . . , or the like is applied to each platform use order preceding train for every platform.

The inter-station track use order preceding train is identification information of a train that uses an inter-station track before the corresponding train uses the target inter-station track. The inter-station track use order preceding train is set for every inter-station track that is used by the corresponding train. In FIG. 6C, an identification number of (1), (2), . . . , or the like is applied to each inter-station track use order preceding train for every inter-station track.

The above-described timetable change pattern is created under the following conditions. In previous operation trains of a change target train, the timetable change pattern is created so that all of trains which are not change target trains become previous operation of any one post-change train. In subsequent operation trains of the change target train, the timetable change pattern is created so that all of trains which are not the change target trains become subsequent operation of any one post-change train. In addition, the timetable change pattern is created so that when a train relating to any one relationship of the preceding train, the previous operation train, and the subsequent operation train is recursively traced from a train specified by the reference train ID, all of trains shown in the timetable change pattern are traced. This is a condition for the train ID corresponding table to be uniquely created. When the above-described conditions are satisfied, it is not necessary for all of trains travelling in a certain time period to be included in the timetable change pattern, and only trains directly related to the timetable change and trains related to the trains (the preceding train, the previous operation train, the subsequent operation train, and the like) may be included in the timetable change pattern.

FIG. 7 is a view for describing the contents of number-of-people-waiting-for-train information D07 stored in the storage unit 103 provided in the target timetable modification device 100 illustrated in FIG. 1.

As illustrated in FIG. 7, a station ID, a platform ID, a time point, the number of people, and the like are included in respective records of the number-of-people-waiting-for-train information D07 stored in the storage unit 103 provided in the target timetable modification device 100 illustrated in FIG. 1. The station ID is identification information for individually identifying stations. The platform ID is identification information for individually identifying platforms in stations. Each of the records of the number-of-people-waiting-for-train information D07 illustrates that the number of people described in the record wait a train at a platform specified by the platform ID of a station specified by the station ID at a time point described in the record. For example, in the example illustrated in FIG. 7, a gist indicating that 30 passengers wait for a train at a platform #1 of a station ST01 at 7:00 is stored.

FIG. 8 is a view for describing the contents of number-of-train-passengers information D08 stored in the storage unit 103 provided in the target timetable modification device 100 illustrated in FIG. 1.

As illustrated in FIG. 8, a train ID, a route ID, a departure station ID, capacity, the number of people, and the like are included in records of the number-of-train-passengers information D08 stored in the storage unit 103 provided in the target timetable modification device 100 illustrated in FIG. 1. The train ID is identification information for individually identifying trains. The route ID is identification information for individually identifying routes. The departure station ID is identification information for individually identifying a station from which a train departs. Each of the records of the number-of-train-passengers information D08 illustrates that the number of people described in the record with respect to the capacity described in the record are boarding on a train specified by the train ID at a point of time of departing from a station specified by the departure station ID in a route specified by the route ID. For example, in the example illustrated in FIG. 8, a gist indicating that 176 passengers are boarding when a train TR001 which travel on a route RT001 and of which the capacity is 300 passengers has departed from a station ST06 is stored.

Figures 9, 10:
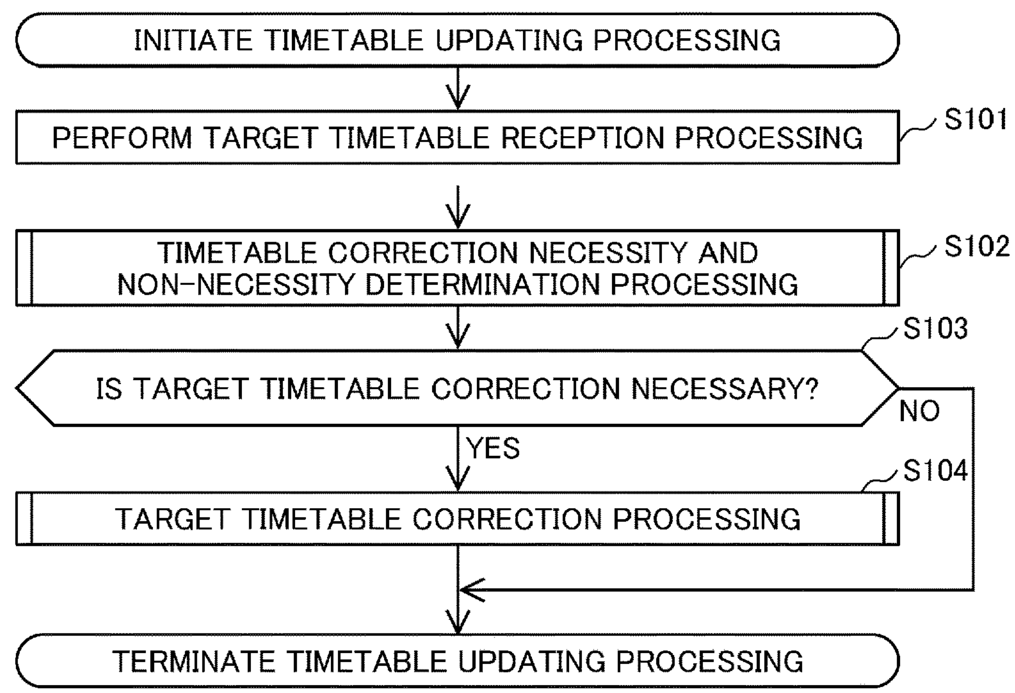
FIG. 9 is a view for describing the contents of movement demand information stored in the storage unit provided in the target timetable modification device illustrated in FIG. 1.
FIG. 10 is a flowchart for describing an operation relating to timetable updating processing among operations of the target timetable modification device illustrated in FIG. 1.

FIG. 9 is a view for describing the contents of movement demand information D09 stored in the storage unit 103 provided in the target timetable modification device 100 illustrated in FIG. 1.

As illustrated in FIG. 9, an entrance time period, a boarding station ID, a getting-off station ID, the number of people, and the like are included in respective records of the movement demand information D09 stored in the storage unit 103 provided in the target timetable modification device 100 illustrated in FIG. 1. The boarding station ID is identification information for individually identifying boarding stations. The getting-off station ID is identification information for individually identifying getting-off stations. Each of the records of the movement demand information D09 illustrates the contents in which the number of people described in the record enter a station identified by the boarding station ID, and desire to go up to a station identified by the getting-off station ID in a time period described in the record.

For example, in the example illustrated in FIG. 9, a gist indicating that 28 passengers enter a station ST06 in a period from 7:00 to 7:10, and desire to go to a station ST05 from a station ST06 is stored.

Hereinafter, a specific operation of the target timetable modification device 100 will be described.

FIG. 10 is a flowchart for describing an operation relating to timetable updating processing among operations of the target timetable modification device 100 illustrated in FIG. 1.

First, the timetable updating program P01 receives a currently applied target timetable from the timetable management device 203 of the operation management system 200 (step S101). In addition, the timetable updating program P01 creates the platform use order information illustrated in FIG. 4A and the inter-station track use order information illustrated in FIG. 4B from the received target timetable.

Next, the timetable updating program P01 performs timetable correction necessity and non-necessity determination processing of determining whether or not correction of the target timetable is necessary (step S102). Details of the timetable correction necessity and non-necessity determination processing will be described later.

In the timetable correction necessity and non-necessity determination processing, in a case where it is determined that the target timetable correction is necessary (YES in step S103), the timetable updating program P01 performs target timetable correction processing (step S104). Details of the target timetable correction processing will be described later.

On the other hand, in the timetable correction necessity and non-necessity determination processing, in a case where it is determined that the target timetable correction is not necessary (NO in step S103), the timetable updating program P01 terminates the timetable updating processing.

The series of processing is repeatedly executed for every predetermined time (for example, five-minute period, or the like) in period activation, but the target timetable modification device 100 may be provided with a command input unit that receives a command input of a command source, and may execute the series of processing at timing of the command input of the command source.

FIG. 11 is a flowchart for describing a detailed operation in timetable correction necessity and non-necessity determination processing S102 illustrated in FIG. 10 among the operations of the target timetable modification device 100 illustrated in FIG. 1.

In the timetable correction necessity and non-necessity determination processing S102, first, the target timetable modification device 100 uses the operation prediction program P02, and performs operation prediction processing of predicting an operation situation of a train group and obtaining the predicted timetable D04 by using the target timetable (planned timetable) D03 and the travel record information D02 (step S201). In the operation prediction processing using the operation prediction program P02, a predicted time point at which an event of arrival or departure is expected to occur is calculated with respect to an arrival time point and a departure time point of each train at each station described in the target timetable D03. At this time, with respect to a portion that has already traveled, the predicted time point is determined on the basis of the travel record information D02, and with respect to a portion that is to travel from now on, a predicted time point in consideration of a relationship with other trains is determined by using information such as reference running time included in the basis data D01.

Next, the target timetable modification device 100 uses the demand prediction program P03, and performs demand prediction processing of predicting people flow in a route by using the predicted timetable D4, the demand pattern database 105, the passenger behavior model D05, and the sensor information D06, and calculating the number-of-people-waiting-for-train information D07, the number-of-train-passengers information D08, and the movement demand information D09 (step S202).

The target timetable modification device 100 determines whether or not a set of a train in which a calculated predicted number of train passengers deviates from a predetermined allowed range and a station exists (step S203). In a case where the set of the train and the inter-station exists (step S203 "YES"), the target timetable modification device 100 determines that correction of the target timetable is necessary (step S204), and terminates the timetable correction necessity and non-necessity determination processing.

In addition, in a case where the set of the train in which the calculated predicted number of train passengers deviates from a predetermined allowed range and a station does not exist (step S203 "NO"), the target timetable modification device 100 determines that correction of the target timetable is not necessary (step S205), and terminates the timetable correction necessity and non-necessity determination processing.

FIG. 12 is a flowchart for describing a detailed operation in the target timetable correction processing S104 illustrated in FIG. 10 among the operations of the target timetable modification device 100 illustrated in FIG. 1.

In the timetable correction processing S104, first, the timetable updating program P01 perform provisionally optimal timetable initialization processing of initializing a provisionally optimal timetable by setting a current target timetable acquired from the timetable management device 203 as the provisionally optimal timetable (step S301). At this time, an evaluation index corresponding to the initialized provisionally optimal timetable is obtained by the same processing as in candidate timetable evaluation processing (step S308) to be described later.

Next, the timetable updating program P01 performs timetable change prohibited train specifying processing of specifying a train for which timetable change is prohibited (step S302). Details of the timetable change prohibited train specifying processing will be described later (FIG. 13).

Figure 14:
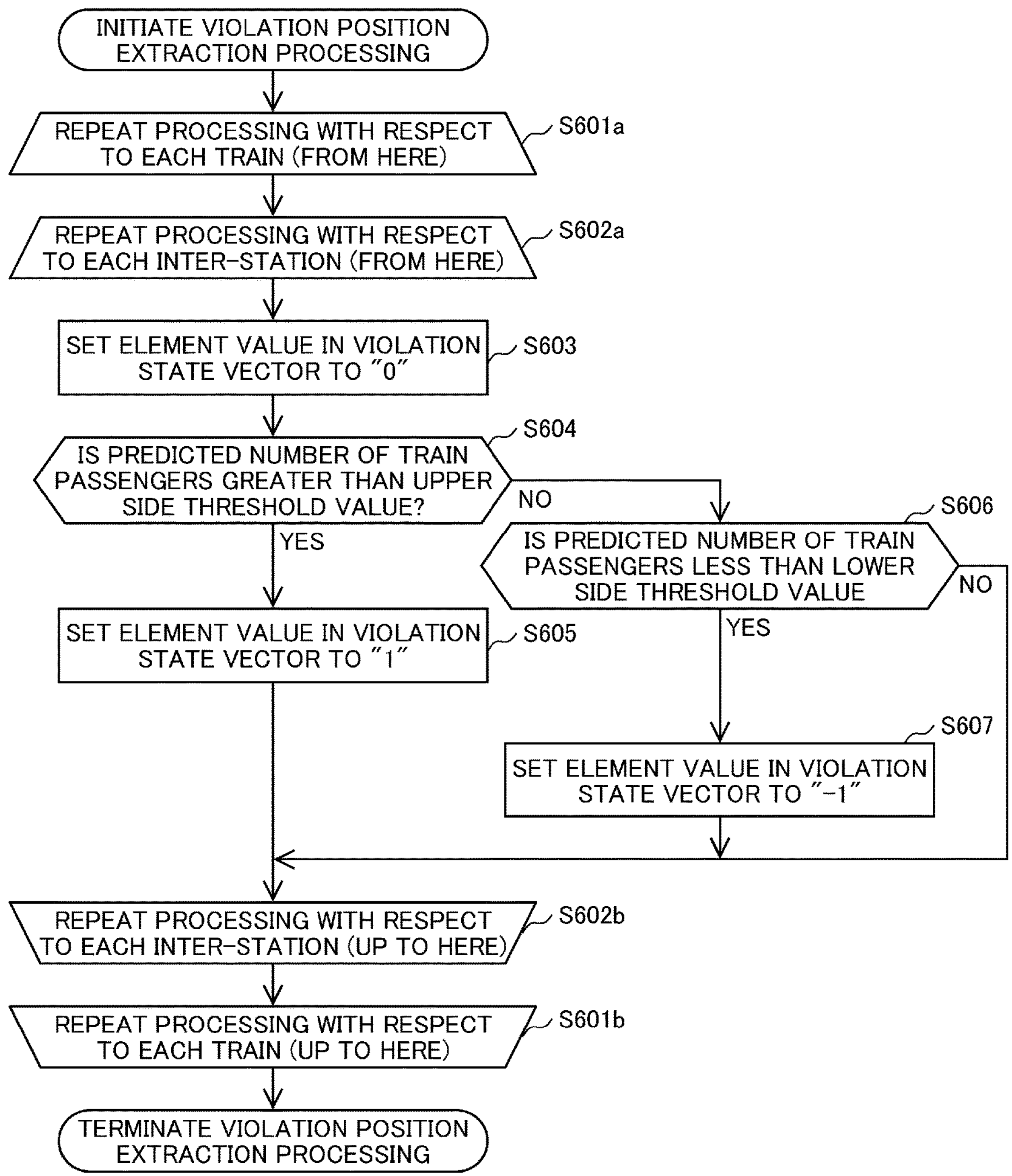
FIG. 14 is a flowchart for describing a detailed operation in violation position extraction processing illustrated in FIG. 12 among the operations of the target timetable modification device illustrated in FIG. 1.

Next, the timetable updating program P01 uses the violation position extraction program P01*a* and performs violation position extraction processing of extracting a violation position for which timetable change is necessary (step S303). Details of the violation position extraction processing will be described later (FIG. 14).

Next, the timetable updating program P01 performs timetable change pattern listing processing of listing a timetable change pattern that is also suitable for change of the target timetable in a current situation (step S304).

Figure 15:
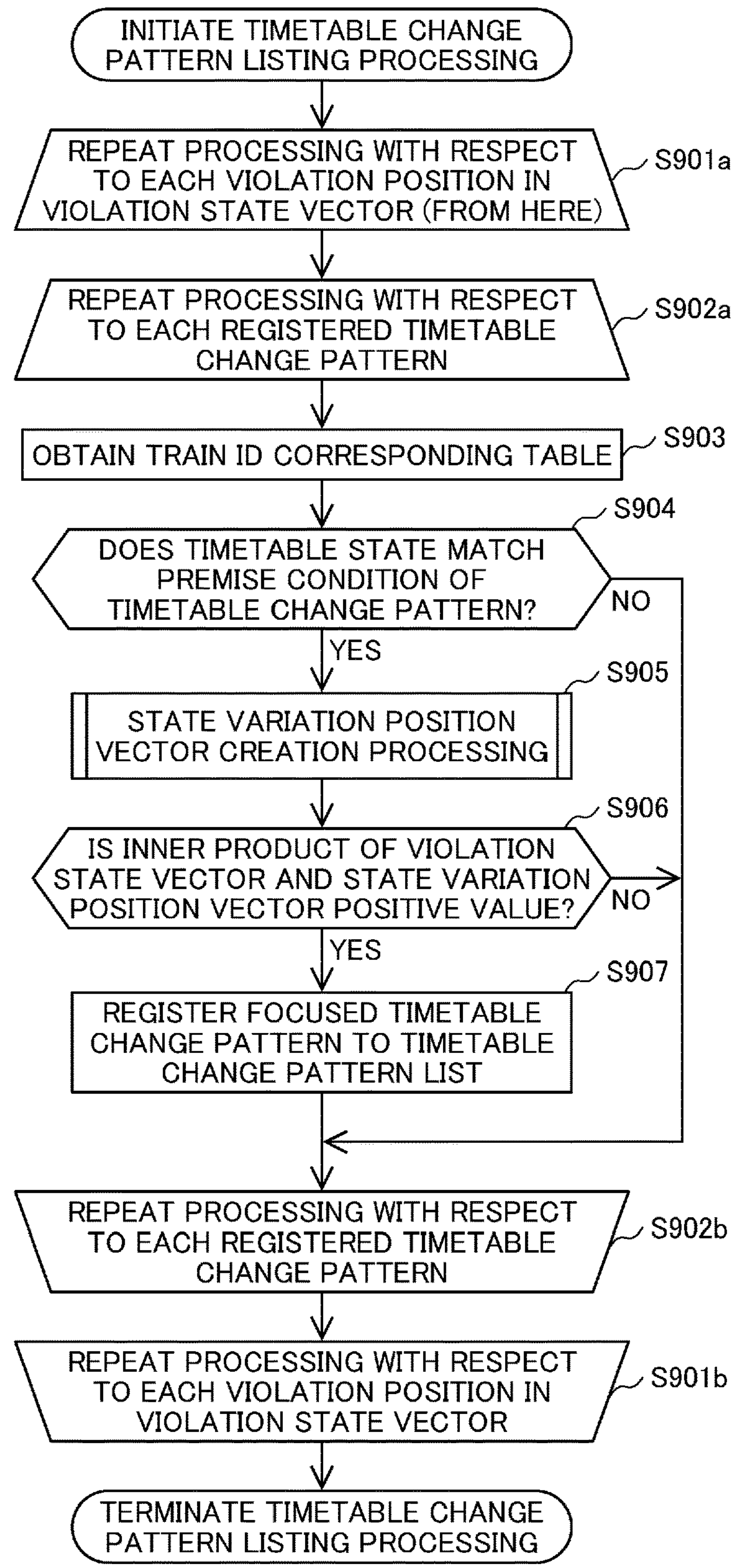
FIG. 15 is a flowchart for describing a detailed operation in timetable change pattern listing processing illustrated in FIG. 12 among the operations of the target timetable modification device illustrated in FIG. 1.

Details of the timetable change pattern listing processing will be described later (FIG. 15).

Next, the timetable updating program P01 performs the following processing with respect to each of timetable change patterns which are listed (step S305*a*).

First, the timetable updating program P01 performs candidate timetable creation processing of creating a candidate timetable on the basis of the target timetable D03 and the timetable change pattern (step S306). Details of the candidate timetable creation processing will be described later (FIG. 17).

Figure 18:
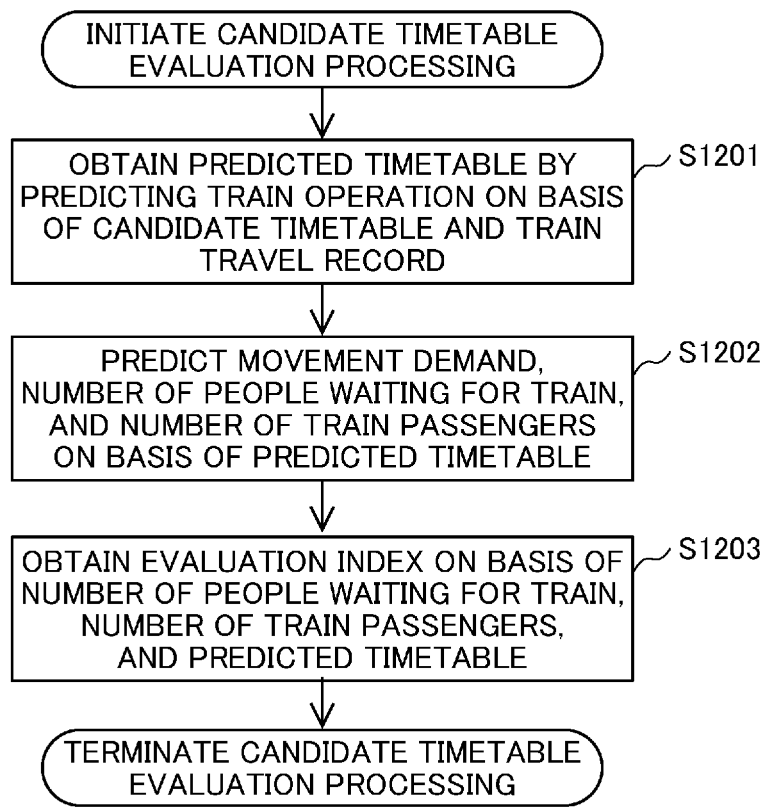
FIG. 18 is a flowchart for describing a detailed operation in candidate timetable evaluation processing illustrated in FIG. 12 among the operations of the target timetable modification device illustrated in FIG. 1.

In a case where it succeeds in creation of the candidate timetable on the basis of the target timetable D03 and the timetable change pattern (step S307 "YES"), the timetable updating program P01 performs candidate timetable evaluation processing (step S308). Specifically, an evaluation index relating to the degree of congestion with respect to the created candidate timetable plan is calculated to evaluate the candidate timetable. Details of the candidate timetable evaluation processing will be described later (FIG. 18).

In the candidate timetable evaluation processing, in a case where a value of the evaluation index of the candidate timetable is better than the provisionally optimal timetable (step S309 "YES"), the timetable updating program P01 sets the candidate timetable as the provisionally optimal timetable (step S310). In this case, a value of an evaluation index corresponding to the provisionally optimal timetable is also updated with the value of the evaluation index of the candidate timetable.

In step S307, in a case where it does not succeed in creation of the candidate timetable on the basis of the target timetable D03 and the timetable change pattern (step S307 "NO") or in step S309, the evaluation index of the candidate timetable in the candidate timetable evaluation processing is poor than the provisionally optimal timetable (step S309 "NO"), the timetable updating program P01 causes the processing to step S305*b* and the processing transitions to processing relating to a next timetable change pattern.

The processing in step S306 to the processing in step S310 are repeatedly performed with respect to each of the timetable change patterns listed in step S304 (step S305*b*).

After the processing in step S306 to the processing in step S310 are completed with respect to all of the timetable change patterns listed in step S304, the timetable updating program P01 sets the provisionally optimal timetable that is finally obtained as a result of the processing in step S301 or step S310 as the target timetable D03 (step S311).

In addition, the target timetable modification device 100 transmits the target timetable set in step S311 to the operation management system 200 through the communication network 900 (step S312), and terminates the target timetable correction processing. Through the above-described series of target timetable correction processing, timetable change suitable for movement demand that is currently predicted can be performed in combination of means such as adjustment (density adjustment) of addition, suspension, and turn-around time, destination change including direction change or utilization of the straying strap, and change of classification of passing and stoppage.

As described above, since the timetable updating program P01 creates one or more timetable change plans with respect to a violation position, generates the predicted demand information by using the demand prediction program P03 with respect to each of the created timetable change plans, calculates the evaluation index related to the degree of congestion with respect to the timetable change plans on the basis of the generated predicted demand information, selects a timetable change plan with the best evaluation index value, and changes the timetable by using the selected timetable change plan, it is possible to easily perform timetable change that appropriately corresponds to predicted demand within a permitted computation time range. For example, a timetable change pattern that is registered in the timetable change pattern database 106 may be carefully selected to obtain a good result in a frequently seen situation, the computation time is monitored, and in a case where the computation time exceeds predetermined computation time, the latest timetable change plan that is obtained at this point of time may be employed.

FIG. 13 is a flowchart for describing a detailed operation in timetable change prohibited train specifying processing S302 illustrated in FIG. 12 among the operations of the target timetable modification device 100 illustrated in FIG. 1.

In the timetable change prohibited train specifying processing S302, first, the timetable updating program P01 sets a time point after passage of predetermined time ΔT from a current time point as a reference time point (step S401). Note that, it is assumed that ΔT is a value including margin time until the updated target timetable is reflected on the timetable management device 203, and is used in control of the train 300.

Next, the timetable updating program P01 initializes a timetable change prohibition flag with respect to each train. Specifically, the timetable change prohibition flag is set off, and timetable change is set to "possible" (step S402).

Next, the timetable updating program P01 performs the following processing with respect to each train (step S403*a*).

First, the timetable updating program P01 confirms whether or not a predicted departure time point that is a departure-station departure time point of a train that is a target to be processed is before the reference time point (step S404).

In a case where the predicted departure-station departure time point of the train that is a target to be processed is not before the reference time point (step S404 "NO"), the timetable updating program P01 performs the following processing with respect to each station (step S405*a*).

First, the timetable updating program P01 confirms whether or not a train that is a target to be processed is displayed on a departure board of a station that is a target to be processed at the reference time point on the basis of the predicted timetable and the platform use order information (step S406). Specifically, for example, the confirmation is made by the following method. First, the timetable updating program P01 acquires how many trains are displayed on the departure board of a focused station with reference to the basis data D01. Next, the timetable updating program P01 acquires a train group that is displayed on the same departure board as in the train that is a target to be processed with reference to the platform use order information relating to each platform of the focused station. Next, the timetable updating program P01 aligns the acquired train group in the order of an earlier departure time point on the predicted timetable, and the timetable updating program P01 obtains that the train that is a target to be processed departs in which rank among trains of which a departure time point is later than the reference time point, that is, a departure rank of the train that is a target to be processed. In a case where the obtained departure rank is less than the number of trains displayed on the departure board, the timetable updating program P01 determines that the train that is a target to be processed is shown on the departure board of the station that is a target to be processed at the reference time point, and in the other cases, the timetable updating program P01 determines that the train that is a target to be processed is not displayed on the departure board of the station that is a target to be processed at the reference time point. Note that, the departure board is a display device that is provided in a station and illustrates train information such as a departure time point of a train of which departure is approaching (or time remaining until the train will depart), a destination, and a vehicle type. Only trains in a number capable of being determined in advance are displayed on the departure board.

In a case where the train that is a target to be processed is not displayed on the departure board of the station that is a target to be processed at the reference time point (step S406 "NO"), the timetable updating program P01 proceeds to step S405*b*, and continues the processing (repeatedly performs the processing in step S406 with respect to each station).

On the other hand, in a case where the predicted departure time point is before the reference time point (step S404 "YES"), or the train that is a target to be processed is displayed on the departure board of the station that is a target to be processed at the reference time point (in step S406 "YES"), the timetable updating program P01 sets on the timetable change prohibition flag of the train that is a target to be processed in a current processing loop (step S407).

The timetable updating program P01 repeatedly performs the processing in step S404 to the processing in step S407 with respect to each train (step S403*b*), and terminates the timetable change prohibited train specifying processing.

As described above, the timetable change prohibited train, which is not set as a target of which operation content (a destination, a stop station, or the like) is to be changed in the timetable change, is specified on the basis of at least any one of the departure-station departure time point that is a time point at which a train is predicted to depart from the departure station, and the departure board display time point that is a time point at which a train is predicted to be displayed on the departure board that displays information relating to a train of which a departure time point is approaching, and the timetable is changed so as not to change the operation content of the timetable change prohibited train in the timetable. According to this, it is possible to actually control the train on the basis of the post-change timetable, and it is possible to correct the timetable so as to have little effect on passengers.

FIG. 14 is a flowchart for describing a detailed operation in the violation position extraction processing S303 illustrated in FIG. 12 among the operations of the target timetable modification device 100 illustrated in FIG. 1. The violation position extraction processing S303 is processing of extracting a violation position on the basis of the number of inter-station passengers, that is, the number of passengers in a train between stations, and creating a violation state vector.

In the violation position extraction processing S303, the timetable updating program P01 performs the following processing with respect to each train and each inter-station (steps S601*a* and S602*a*).

First, the timetable updating program P01 sets an element value in the violation state vector to "0" (with no violation) (step S603).

Next, in a case where the predicted number of train passengers which is calculated as the degree of inter-station congestion by the demand prediction processing in step S202 is greater than the upper limit value of the allowed range which is an upper side threshold value (step S604 "YES"), the timetable updating program P01 sets the element value in the violation state vector to "1" (with congestion side violation) (step S605).

On the other hand, in a case where the predicted number of train passengers which is calculated as the degree of inter-station congestion by the demand prediction processing in step S202 is equal to or less than the upper limit value of the allowed range which is the upper side threshold value (step S604 "NO"), the timetable updating program P01 proceeds to step S606, and in a case where the predicted number of train passengers which is calculated as the degree of inter-station congestion by the demand prediction processing in step S202 is less than the lower limit value of the allowed range which is the lower side threshold value (step S606 "YES"), the timetable updating program P01 sets the element value in the violation state vector to "−1" (with non-congestion side violation) (step S607).

The processing in step S603 to the processing in step S607 are repeatedly performed with respect to each train and with respect to each inter-station (steps S602*b* and S601*b*), and the violation position extraction processing is terminated.

FIG. 15 is a flowchart for describing a detailed operation in timetable change pattern listing processing S304 illustrated in FIG. 12 among the operations of the target timetable modification device 100 illustrated in FIG. 1.

In the timetable change pattern listing processing S304, the timetable updating program P01 performs the following processing with respect to each position of which the value in the violation state vector is "1" or "−1" and with respect to each timetable change pattern stored in the timetable change pattern database 106 (steps S901*a* and S902*a*).

First, the timetable updating program P01 obtains a corresponding relationship between the train ID on the target timetable and the local train ID on the timetable change pattern on the basis of the reference train ID and the focused violation position, and obtains the train ID corresponding table (step S903). Specifically, a preceding train, a previous operation train, and a subsequent operation train may be traced from a train specified by the reference train ID on the timetable change pattern by using a configuration in which a train specified by the reference train ID on the timetable change pattern is associated with a train corresponding to the focused violation position on the target timetable, and the trains may be associated with trains having the same relationship on the target timetable. In a case where the association cannot be performed, this case represents that the focused timetable change pattern is not applicable to the focused violation position. Accordingly, in the subsequent processing in S904, it is determined that "a state of the timetable does not match a premise condition of the timetable change pattern" (step S904 "NO").

Next, the timetable updating program P01 obtains a train on the target timetable which corresponds to each train in the timetable change pattern with reference to the train ID corresponding table obtained in step S903, and determines whether or not the state of the timetable matches the premise condition of the timetable change pattern (step S904). Specifically, in a case where the timetable change prohibited train is included in the change target train group, determination is made as "matching with the premise condition is not established". In addition, with respect to respective trains included in the change target train group, in a case where a route ID of a corresponding train and a route ID of a train on the target timetable which corresponding to the corresponding train do not match each other, determination is made as "matching with the premise condition is not established". In addition, with respect to the respective trains included in the change target train group, in a case where a route ID of a preceding train of the corresponding train, and a route ID of a preceding train of a train on the target timetable which corresponds to the corresponding train, determination is made as "matching with the premise condition is not established". In addition, with respect to the respective trains included in the change target train group, in a case where stations in which operation connection with a previous operation train or a subsequent operation train are different from each other, determination is made as "matching with the premise condition is not established". In addition, with respect to respective trains included in the post-change train group, in a case where a subsequent train (that is, "a train with a lower rank by one step in the platform use order" or "a train with a lower rank by one step in the inter-station track use order") is the timetable change prohibited train, determination is made as "matching with the premise condition is not established". In addition, with respect to the respective trains included in the post-change train group, in a case where a route ID of a preceding train of a corresponding train and a route ID of a preceding train of a train on the target timetable which corresponding to the corresponding train do not match each other, determination is made as "matching with the premise condition is not established". In addition, with respect to the respective trains included in the post-change train group, in a case where stations in which operation connection with a previous operation train or a subsequent operation train is established are different from each other, determination is made as "matching with the premise condition is not established". In the case of not corresponding to any of the cases, determination is made "matching with the premise condition is established". On the other hand, the purpose of determining whether or not a subsequent train corresponds to the timetable change prohibited train with respect to the trains included in the post-change train group is to guarantee that the corresponding train does not correspond to the timetable change prohibited train since when the corresponding train is added to the candidate timetable in candidate timetable creation processing to be described later, there is a possibility that the corresponding train may be added at an early time period in comparison to a train that is specified by the reference train ID.

Figure 16:
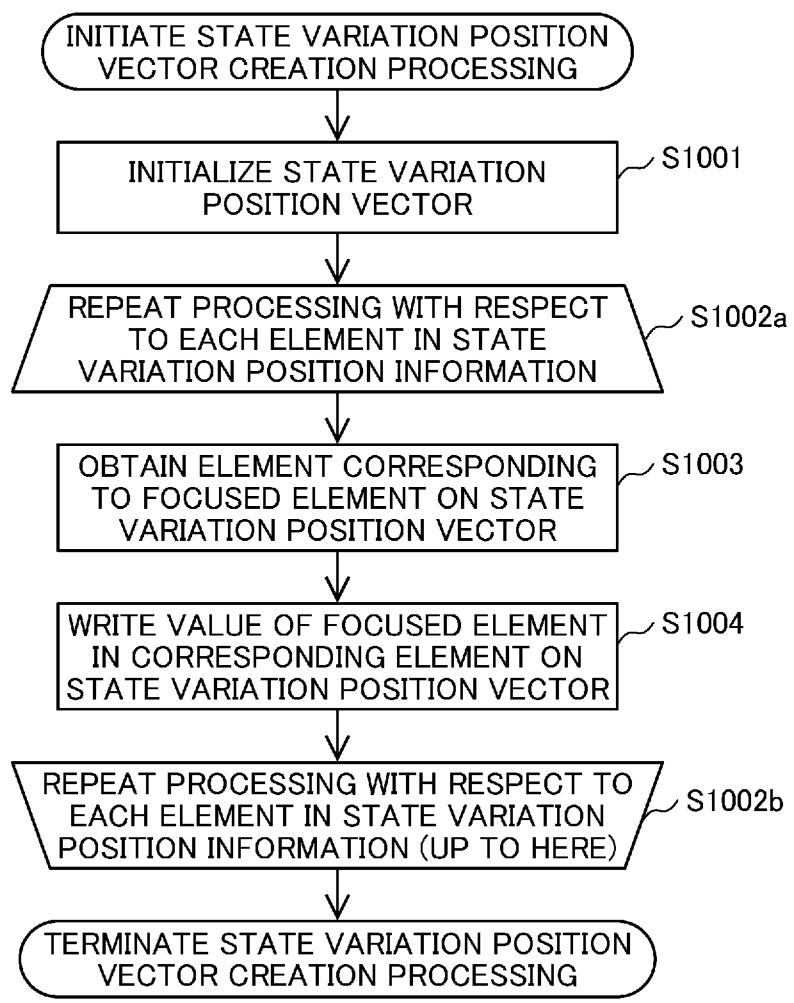
FIG. 16 is a flowchart for describing a detailed operation in state variation position vector creation processing illustrated in FIG. 15 among the operations of the target timetable modification device illustrated in FIG. 1.

In addition, from a result the determination in step S904, in a case where the state of the timetable matches the premise condition of the timetable change pattern (step S904 "YES"), state variation position vector creation processing of creating a vector of a state variation position is performed (step S905). Details of the state variation position vector creation processing will be described later (FIG. 16).

In addition, in a case where an inner product of the violation state vector and the state variation position vector is a positive value (YES in step S906), the timetable updating program P01 determines that the timetable change is effective, and registers the focused timetable change pattern in a timetable change pattern list (step S907).

On the other hand, in a case where the timetable state does not match the premise condition of the timetable change pattern (step S904 "NO") or the value of the inner product of the violation state vector and the state variation position vector is not a positive value (step S906 "NO"), the timetable updating program P01 proceeds to step S902*b* and continues the processing.

The timetable updating program P01 repeatedly performs the processing in step S903 to the processing in step S907 with respect to each of positions at which the value in the violation state vector is "1" or "−1", and with respect to each of timetable change patterns stored in the timetable change pattern database 106 (steps S902*b* and S901*b*), and terminates the timetable change pattern listing processing.

FIG. 16 is a flowchart for describing a detailed operation in state variation position vector creation processing S905 illustrated in FIG. 15 among the operations of the target timetable modification device 100 illustrated in FIG. 1.

In the state variation position vector creation processing S905, first, the target timetable modification device 100 initializes each element to "0" with respect to the state variation position vector (step S1001). The state variation position vector is a vector having the same dimension as in the violation state vector, and a numerical value indicating a state variation method in each inter-station of each train on the target timetable is retained in each element. Note that, the orders of the elements of the state variation position vector and the violation state vector (an element of which order corresponds to which inter-station of which train) may be set to be the same as each other.

Next, the timetable updating program P01 performs the following processing with respect to respective elements in the state variation position information D26 with reference to the state variation position information D26 included in the focused timetable change pattern information D20 (refer to FIG. 6A) (step S1002*a*).

First, the timetable updating program P01 obtains an element corresponding to a focused element on the state variation position vector (step S1003). Specifically, the timetable updating program P01 obtains the focused element in the state variation position information is an element corresponding to which inter-station of which train on the target timetable with reference to the train ID corresponding table.

Next, the timetable updating program P01 writes a value of the focused element in the corresponding element on the state variation position vector (step S1004). According to this, a portion that is influenced by the timetable change pattern in the state variation position vector is updated on the basis of the state variation position information.

The processing in step S1003 to the processing in step S1004 are repeatedly performed with respect to respective elements in the state variation position information (step S1002*b*) and the state variation position vector creation processing is terminated.

FIG. 17 is a flowchart for describing a detailed operation in the candidate timetable creation processing S306 illustrated in FIG. 12 among the operations of the target timetable modification device 100 illustrated in FIG. 1.

In the candidate timetable creation processing S306, first, the timetable updating program P01 obtain a corresponding relationship between a train ID on the target timetable and a local train ID on the timetable change pattern on the basis of the reference train ID and the focused violation position, and obtains the train ID corresponding table (step S1101). Here, the processing in step S1101 is the same as the processing in step S903.

Next, the timetable updating program P01 duplicates the target timetable and sets the target timetable as an initial value of the candidate timetable, thereby initializing the candidate timetable (step S1102).

Next, the timetable updating program P01 deletes a train designated as a change target train group from the candidate timetable on the basis of the train ID corresponding relationship (step S1103).

Next, the timetable updating program P01 allocates a new train ID to a train that is designated as a post-change train group on the basis of the corresponding relationship of the train ID, and adds the train to the candidate timetable (step S1104).

Next, the timetable updating program P01 adjusts an operation time point on the candidate timetable with respect to the train designated as the post-change train group so that the maximum waiting time is satisfied and operation intervals become approximately the same as each other (step S1105). For example, turn-over time relating to a train that is an adjustment target may be set as a variable, an objective function relating to a variation of an operation interval for every destination in a predetermined station may be created under restriction in which the user order of respective resources is not changed from an order defined in the candidate timetable, restriction in which inter-station running time or stoppage time at a station is not changed from time defined in the candidate timetable, restriction in which a predetermined time interval is secured between trains at a position in which routes of the trains compete each other, and restriction in which the maximum waiting time does not exceed a predetermined value, and a set of turn-around time (it is assumed that the turn-around time can be individually set with respect to each train that is an adjustment target) which minimizes the objective function, that is, the variation of the operation interval for every destination may be obtained to adjust the running interval between trains. Note that, in the time interval adjustment processing in step S1105, in addition to trains designated as the post-change train group, several previous and subsequent trains may be set as the adjustment target. However, in this case, a train that is set as the time interval adjustment target is selected so that the timetable change prohibited train does not become the adjustment target.

Next, the timetable updating program P01 predicts train operation on the basis of the candidate timetable and the train travel record by using the operation prediction program P02, and obtains the predicted timetable. In addition, the running interval between trains is corrected by setting the obtained predicted timetable as the candidate timetable (step S1106). According to this, it is possible to guarantee execution possibility in the entirety of a train operation network including a continuation time interval at a merging position and the like (control possibility of each train 300 in conformity to in the candidate timetable).

As described above, in the case of changing the timetable by using the timetable change pattern, it is possible to change the timetable so that a train is allowed to travel in an appropriate manner and with the same intervals for every destination by adjusting the train departure time in the post-change timetable so that the running interval of the train after timetable change becomes equal for every destination. Accordingly, it is possible to allow the train to travel with a timetable that appropriately corresponds to the degree of congestion in the movement demand.

In a case where the candidate timetable satisfies a condition of the maximum waiting time (YES in step S1107), the timetable updating program P01 determines that creation of the candidate timetable succeeds (step S1108).

On the other hand, in a case where the candidate does not satisfy the condition of the maximum waiting time (NO in step S1107), the timetable updating program P01 determines that creation of the candidate timetable fails (step S1109).

After performing the processing in step S1101 to the processing in step S1109, the timetable updating program P01 terminates the candidate timetable creation processing.

FIG. 18 is a flowchart for describing a detailed operation in the candidate timetable evaluation processing S308 illustrated in FIG. 12 among the operations of the target timetable modification device 100 illustrated in FIG. 1.

In the candidate timetable evaluation processing S308, first, the timetable updating program P01 predicts train operation on the basis of the candidate timetable and a train travel record by using the operation prediction program P02, and obtains the predicted timetable (step S1201).

Next, the timetable updating program P01 predicts the movement demand, the number of people waiting for a train, and the number of train passengers on the basis of the predicted timetable by using the demand prediction program P03 (step S1202).

Next, the timetable updating program P01 calculates a value of an evaluation index on the basis of the number of people waiting for a train, the number of train passengers, and the predicted timetable (step S1203). For example, k1 and k2 may be predetermined non-negative value, the evaluation index can be calculated by using an evaluation expression of k1×(the number of people in a portion exceeding the upper limit value of the allowed range in the number of train passengers between stations)+k2×(the number of people in a portion less than the lower limit value of the allowed range in the number of train passengers between stations). The evaluation index capable of reflecting the degree of violation such as the number of people which exceeds the upper limit value of the allowed range is used instead of an evaluation index such as "the number of congested inter-stations", and thus a behavior such as "creation of a major violation position by improving many minor violation positions" is suppressed, and thus it is possible to realize a behavior of equalizing the degree of congestion.

After performing the processing in step S1201 to the processing in step S1203, the timetable updating program P01 terminates the candidate timetable evaluation processing.

The timetable updating program P01 calculates the evaluation index after timetable change by the above-described processing with respect to the timetable change pattern stored in the timetable change pattern database 106, selects a timetable change pattern with the highest evaluation index, and changes the timetable by using the selected timetable change pattern. According to this, with respect to a complicated train set optimization problem including change of a train travel route, change of vehicle operation, and the like, it is possible to retrieve a satisfactory change plan within a short time, and it is possible to make timetable change according to movement demand.

As described above, this embodiment is configured to perform timetable change including destination change so as to improve a position where the degree of congestion needs to be improved with respect to a train group for which timetable change is permitted with focus given to locality of temporal and spatial movement demand. According to this configuration, it is possible to supply transportation capacity suitable for movement demand for every time period in more situations in comparison to the related art. For example, in the case of raising operation density of a portion in which the degree of congestion is high, it is possible to substitute the transportation capacity of a position with relatively low movement demand with the transportation capacity of a position with relatively high movement demand, and thus it is possible to raise the operation density with a small number of vehicles in comparison to a case where the operation density is raised by shortening the turn-over time or by increasing the number of vehicles. In addition, since time required for preparation for improvement by time for transporting a train from the vehicle base or the like is further shortened in comparison to a case where the operation density is raised by increasing the number of vehicles, it is possible to improve a situation in a time period closer to a current time point, that is, a time period for which demand prediction is expected to be more accurate. In addition, it is possible to adjust a train interval with a finer resolution in comparison to a case where a train interval is greatly increased due to suspension of operation.

In addition, in this embodiment, a train group that is a change target is specified by using a timetable change pattern prepared in advance, a travel route and a travel order of a train group after change are specified, and an operation method of a vehicle is specified. According to this configuration, in comparison to the case of attempting timetable change by sequentially performing a sequence of determining how many trains will be caused to travel along which travel route in which order so as to improve a position that needs to be improved (train plan), a sequence of determining that the same train set is to be allocated to which train group (route creation), a sequence of determining that which train is physically allocated to each train set (vehicle allocation), and a sequence of performing correction by trial and error when an executable solution is not found, it is possible to obtain the solution within shorter time.

In addition, this embodiment, the timetable change prohibited train is specified under a condition that a destination is not changed after leaving a departure station, and the candidate timetable is created under a condition that "the timetable change prohibited train is not included in the change target train group and the timetable change prohibited train is not included in a subsequent train of a post-change train group" so that a train of which a destination is changed does not occur after leaving a departure station in the target timetable correction processing. According to this, it is possible to update the target timetable without causing inconvenience to passengers who have already boarded the train.

In addition, this embodiment, the timetable change prohibited train is specified under a condition that the display content of a departure board of each station is not changed, and the candidate timetable is created under a condition that "the timetable change prohibited train is not included in the change target train group and the timetable change prohibited train is not included in a subsequent train of a post-change train group" so that a train for which change of the display content of the departure board occurs does not occur in the target timetable correction processing. According to this, it is possible to update the target timetable without causing passengers who view the departure board to make an erroneous determination.

Modification Example

Hereinbefore, description has been given of the embodiment of the invention, but the invention is not limited to the above-described embodiment, and various modifications can be made in a range without departing from the gist of the invention.

For example, in the above-described embodiment, the timetable change pattern is retained as "data" to perform target timetable change. However, instead of the configuration, the timetable change pattern may be set as a series of procedure of timetable change and may be provided as a part of the timetable updating program, and the target timetable change may be performed.

In addition, in the above-described embodiment, only one timetable change pattern is selected and applied, but the invention is not limited thereto. For example, after application of one timetable change pattern, extraction of a position that needs to be improved may be performed again, and processing of selecting and applying an appropriate timetable change pattern with respect to the position that still needs to be improved may be performed in a predetermined number of times or may be repeatedly performed until the position that needs to be improved is no longer improved.

In addition, in the above-described embodiment, for efficient processing, the timetable change pattern information D20 includes the state variation position information D26, and in the timetable change pattern listing processing in step S304, only hopeful timetable change patterns are listed, but the configuration of the invention is not limited thereto. For example, in the timetable change pattern listing processing in step S304, in determination in step S904, it is determined that "a timetable state matches a premise condition of the timetable change pattern" (step S904 "YES"), the processing in step S905 and the processing in step S906 may be omitted, and it may directly proceed to step S907, and a focused timetable change pattern may be registered to the list of the timetable change pattern. The configuration may be preferable in a case where the evaluation index used in the processing in step S1203 is complicated, and in simple checking with the state variation position information D26, it is difficult to sufficiently determine whether or not the focused timetable change pattern will be hopeful.

In addition, in the above-described embodiment, for efficient processing, the timetable change pattern information D20 includes the state variation position information D26, and in the timetable change pattern listing processing in step S304, only hopeful timetable change patterns are listed, but the configuration of the invention is not limited thereto. For example, the timetable change pattern information D20 is configured to include "applicable time period information (information indicating an initiation time point and a termination time point of a time period for which timetable change pattern is permitted to be used)". Before the processing of obtaining the train ID corresponding table in step S903 in the timetable change pattern listing processing S304, determination may be made as to whether or not a current time point is included in the applicable time period. In a case where the current time point is not included in the applicable time period, the processing in step S903 and the processing in step S907 may be skipped, and the processing may transition to the subsequent timetable change pattern processing. According to this configuration, for example, it is possible to use a timetable change pattern different from a timetable change pattern in a different time period only in a morning rush time period.

In addition, in the above-described embodiment, in the processing in step S1203, an evaluation index relating to only the degree of congestion is used, but the invention is not limited thereto. For example, it is possible to use a multi-purpose evaluation index (for example, use of a predetermined coefficient, a linear sum of indexes, and the like) in which several indexes such as total travel time, total energy consumption, a total travel distance, and total delay time, which are capable of being calculated on the basis of an operation prediction result, a demand prediction result, or both the results, are combined. According to this configuration, it is possible to reflect a difference in the value standard of each train operator when correcting the target timetable. Note that, the maximum waiting time may be incorporated into the evaluation index as a term that requires a penalty in a case where compliance cannot be achieved instead of taking the maximum waiting time as a restriction condition.

In addition, in the above-described embodiment, in the processing in step S1203, an evaluation index with focus given to the degree of inter-station congestion is used, but the invention is not limited thereto. For example, several inter-stations may be collectively treated as a group, and an evaluation index based on a representative value of the degree of inter-station congestion in the group (for example, a maximum value or an average value) may be used. In a section that includes a plurality of continuous inter-stations and is not provided with train turn-around equipment, even in a case where the degree of congestion is higher than the upper limit value of the allowed range in some inter-stations, and the degree of congestion is lower than the lower limit value of the allowed range in the other inter-stations, as means for improvement, it is possible to select only one of raising of the train operation density in the section or lowering thereof. Accordingly, for example, in a case where there is a section in which the train turn-around equipment is not present and the station order continues long, it is preferable to employ the configuration.

In addition, in the above-described embodiment, in the processing in step S406, the timetable updating program P01 confirms "whether or not a train that is a target to be processed is shown on a departure board of a station that is a target to be processed at a reference time point" on the basis of the predicted timetable and the platform use order, but the invention is not limited thereto. For example, information may be transmitted and received to and from a device that manages display content on the departure board through the communication network 900 or the like, in the processing in step S406, a list of trains displayed on the departure board of a station at the reference time point may be acquired from the device, and it may be determined whether or not the train that is a target to be processed is shown on the departure board of the station that is a target to be processed at the reference time point.

In addition, in the above-described embodiment, in the timetable change pattern listing processing in step S304, checking on the timetable change prohibited train is performed, but the invention is not limited thereto. For example, checking on the timetable change prohibited train may be performed in the candidate timetable creation processing in step S306.

In addition, in the above-described embodiment, the target timetable modification device 100 acquires the latest target timetable that is currently applied from the operation management system 200, and creates the resource use order information (platform use order information and inter-station track use order information) on the basis of the target timetable, but the invention is not limited thereto. The resource use order information may be included as a part of the target timetable. In this configuration, in the target timetable correction processing in step S104, the provisionally optimal timetable may be set as the target timetable in step S311, the resource use order information may be updated on the basis of the latest target timetable, and then the target timetable transmission processing in step S312 may be performed.

In addition, in the above-described embodiment, description has been given of an application example for a railway, but the invention is not limited thereto. The invention is widely applicable to a transportation system such as light rail transit (LRT) and a bus of which operation is managed on the basis of a time point table, and which travel on a predetermined route. For example, as the operation prediction program P02, a known technology which is provided a function such as delay prediction for load traffic and is capable of performing operation prediction processing may be employed, and a known technology for load traffic may be similarly used for the demand prediction program P03. Although a case where control conforming to the target timetable may not be performed due to a situation in which all vehicle on a road are not under the control of an operation management system, a situation in which a restriction condition relating to passing is looser on the load in comparison to a track, and the like. However, when updating the target timetable on the basis of a travel record, it is possible to generally expect operation according to the target timetable. In addition, in the violation position extraction processing in step S303, in a case where a travel route between adjacent bus stops is congested, the route may be extracted as a violation position, and the timetable change pattern that replaces a planned travel route with a bypass route may be registered in the timetable change pattern database 106. According to this, under an appropriate evaluation index, the target timetable can be corrected so as to travel along the bypass route during traffic congestion toward the next bus stop. According to this configuration, it is possible to suppress an increase in the number of vehicle passengers due to traffic congestion.

REFERENCE SIGNS LIST

100 Target timetable modification device
101 CPU
102 Memory
103 Storage unit

104 Communication unit
105 Demand pattern database
106 Timetable change pattern database
200 Operation management system
201 Train tracking device
202 Course control device
203 Timetable management device
204 Operation prediction device
205 Running arrangement terminal
300 Train
400, 500 Sensor
900 Communication network

The invention claimed is:

1. A timetable modification device configured to change a timetable used in an operation management system that is configured to control movement of a vehicle automatically based on the timetable, in correspondence with a movement demand prediction result indicating a destination of passengers and a number of the passengers in each station of a plurality of stations at which the vehicle stops for every time period, comprising:

a violation position extraction unit configured to calculate a degree of congestion of the vehicle based on predicted demand information indicating the movement demand prediction result, and extract a violation position at which the degree of congestion is outside of an allowed range; and a timetable correction unit configured to change the timetable to a changed timetable so that the degree of congestion of the violation position is within the allowed range or so that the degree of congestion of the violation position approaches the allowed range; wherein the timetable correction unit is configured to change the timetable to the changed timetable so as to include a change of a direction of a route for the vehicle and an adjustment of turn-around time of the vehicle, and update the timetable used in the operation management system to correspond to the changed timetable, such that the operation management system controls the movement of the vehicle based on the changed timetable; and the timetable correction unit is configured to change the timetable for several lines having some common sections but heading in different directions to the changed timetable by adjusting the number of services between the several lines by accommodating a number of available vehicles and adjusting a number of services between the several lines by flexing the available vehicles; and the timetable correction unit is configured to determine a timetable change prohibited vehicle that is not set as an operation change target in the timetable change based on at least any one time point of a starting station departure time point that is a time point at which the vehicle is predicted to leave a starting station of the route, and a departure board display time point that is a time point at which the vehicle is predicted to be displayed on a departure board that displays information relating to the vehicle of which a departure time point is approaching, and change the timetable so as not to change operation of the timetable change prohibited vehicle in the timetable.

2. The timetable modification device according to claim 1, further comprising: a timetable change pattern database configured to store a timetable change pattern in which a change method of the timetable is determined in advance, which specifies which services are to be deleted and which services are to be added for a range of services that can be traced from a reference service to a pre-change timetable based on an order relationship and an operational relationship, wherein the timetable correction unit is further configured to calculate an evaluation index relating to a post-change timetable in response to performing a timetable change by using the timetable change pattern stored in the timetable change pattern database, select a timetable change pattern with a highest evaluation index, and change the timetable by using the selected timetable change pattern.

3. The timetable modification device according to claim 2, wherein the timetable change pattern includes information of a vehicle travel route before and after the timetable change.

4. The timetable modification device according to claim 2, wherein the timetable change pattern includes information for specifying a stop station and a pass station of the vehicle before and after the timetable change.

5. The timetable modification device according to claim 2, wherein the timetable change pattern includes information for specifying a previous operation service and a subsequent operation service assigned for the vehicle after the timetable change.

6. The timetable modification device according to claim 2, wherein the timetable correction unit is further configured to adjust a vehicle departure time point in the post-change timetable so that a vehicle running interval after timetable change becomes equal for every destination among two or more destinations in response to changing the timetable by using the timetable change pattern.

7. The timetable modification device according to claim 1, further comprising:

a demand prediction unit configured to predict a future movement demand by using a given timetable, and generate predicted demand information including information of the future movement demand, wherein the timetable correction unit is further configured to create one or more timetable change plans with respect to the violation position, generate the predicted demand information by using the demand prediction unit with respect to each of the one or more timetable change plans, calculate an evaluation index relating to a degree of congestion with respect to the one or more timetable change plans based on the predicted demand information, select a timetable change plan with a best evaluation index, and change the timetable by using the selected timetable change plan.

* * * * *